(12) United States Patent
Hinds et al.

(10) Patent No.: US 6,170,001 B1
(45) Date of Patent: Jan. 2, 2001

(54) SYSTEM FOR TRANSFERING FORMAT DATA FROM FORMAT REGISTER TO MEMORY WHEREIN FORMAT DATA INDICATING THE DISTRIBUTION OF SINGLE OR DOUBLE PRECISION DATA TYPE IN THE REGISTER BANK

(75) Inventors: Christopher N. Hinds, Austin, TX (US); David J. Seal, Cambridge (GB)

(73) Assignee: Arm Limited, Cambridge (GB)

( * ) Notice: Under 35 U.S.C. 154(b), the term of this patent shall be extended for 0 days.

(21) Appl. No.: 09/085,756

(22) Filed: May 27, 1998

(51) Int. Cl.$^7$ ............................................ G06F 7/38
(52) U.S. Cl. ........................... 708/495; 707/6; 707/522; 707/523; 712/2; 710/65
(58) Field of Search .................................. 708/204, 495; 710/65; 712/2; 707/6, 522, 523

(56) References Cited

U.S. PATENT DOCUMENTS

| | | | |
|---|---|---|---|
| 3,930,232 | * 12/1975 | Wallach et al. | 710/65 |
| 4,755,965 | * 7/1988 | Mary et al. | 713/501 |
| 5,732,005 | * 3/1998 | Kahle et al. | 708/495 |
| 5,805,475 | * 9/1998 | Putrino et al. | 708/204 |
| 5,887,183 | * 3/1999 | Agarwal et al. | 712/2 |
| 5,901,316 | * 5/1999 | Goebel | 395/705 |
| 5,940,311 | * 8/1999 | Dao et al. | 708/204 |

FOREIGN PATENT DOCUMENTS

| | | |
|---|---|---|
| 0483967 | * 5/1992 | (EP) . |
| 0 483 967 | 5/1992 | (EP) . |

* cited by examiner

Primary Examiner—Meng-Ai T. An
Assistant Examiner—Nabil El-Hady
(74) Attorney, Agent, or Firm—Nixon & Vanderhye P.C.

(57) ABSTRACT

A data processing apparatus and method is provided, wherein in a first mode of operation, data of a first data type is processed, and in a second mode of operation, data of a second data type consisting of an even multiple of data words is processed. The data processing apparatus comprises a register bank having a plurality of data slots for storing data words of data of said first type data and data words of data of said second type data, and transfer logic, responsive to a store instruction, to control the storing of the data words in the register bank to a memory. Further, a format register is provided for storing format data indicating the distribution in the register bank of data words of data of said first data type and data words of data of said second data type. In said second mode, the transfer logic is responsive to said store instruction specifying an even number of data words to cause those data words to be stored from said register bank to said memory, and is responsive to said store instruction specifying an odd number of data words, to cause the format data from the format register to be stored to said memory along with an even number of data words from the register bank.

Hence, in situations where the data in the register bank needs to be temporarily stored to memory for subsequent retrieval into the register bank, all that is required is for the store instruction to be issued in said second mode specifying an odd number of data words, and this will automatically cause the contents of the format register to be stored to memory in addition to the required even number of data words from the register bank.

18 Claims, 14 Drawing Sheets

SYSTEM FOR TRANSFERING FORMAT DATA FROM FORMAT REGISTER TO MEMORY WHEREIN FORMAT DATA INDICATING THE DISTRIBUTION OF SINGLE OR DOUBLE PRECISION DATA TYPE IN THE REGISTER BANK

BACKGROUND OF THE INVENTION

1. Field of the Invention

The present invention relates to the transferring of data between registers and memory in a data processing apparatus, and in particular to the transferring of such data in a data processing apparatus, wherein in a first mode of operation, data of a first data type consisting of an odd multiple of data words is processed, and in a second mode of operation, data of a second data type consisting of even number of data words is processed.

2. Description of the Prior Art

It is known to provide a data processing apparatus which can process data of different data types. For example, data of a first data type may consist of a first number of data words, whilst data of a second data type may consist of a second number of data words. For the purpose of the present invention, the term "data word" refers to a block of data having a predetermined number of data bits, but should not be construed as indicating any particular length. In preferred embodiments, a data word is a 32-bit block of data.

Hence, as an example, a data processing apparatus may be arranged in a first mode of operation to process single precision data consisting of a single data word, or in a second mode of operation, to process double precision data consisting of two data words. Alternatively, or in addition, other data types, such as triple or quadruple precision data, may be processed.

Prior to executing instructions on such data, it is usual for the data to first be loaded into a register bank. Separate register banks could be provided for each data type. Hence, as an example, single precision data would be stored in a single precision register bank, and double precision data would be stored in a double precision register bank. However, this approach may lead to the requirement for a large number of registers, thereby occupying a relatively large chip area.

In an alternative arrangement, a single register bank could be provided, with all data (irrespective of data type) being converted to a single internal representation prior to being stored in the register bank. Hence, considering the single and double precision example, each register in the register bank could be large enough to accommodate a double precision data value, and single precision data values could be expanded to a double precision format prior to being stored in the register bank. However, it will be appreciated that this approach can prove inefficient, since the internal representation needs to be large enough to accommodate data of the largest data type.

It is proposed to provide a single register bank for storing data of different data types, the register bank having a plurality of data slots for storing data words forming data of both a first data type (consisting of an odd multiple of data words) and a second data type (consisting of an even multiple of data words). By this approach, more efficient use of register bank space can be made. However, one problem occurs when the contents of the register bank need to be stored temporarily to memory, and then subsequently retrieved back into the register bank. When the data is loaded back into the register bank, the data processing apparatus may need to know whether any particular data word forms data of the first data type or data of the second data type. For example, this information may need to be available to subsequently executed processes. Further, if the internal format of the data (i.e. the format in the register bank) differs from the external format (i.e. the format in memory), and the differences depend on the data type, then the data processing apparatus needs to have access to the above information before the data can be reloaded into the register bank from memory.

Hence, it is an object of the present invention to alleviate the above identified problem in a data processing apparatus where a register bank may store data of different data types, data of a first data type consisting of odd multiples of data words, and data of a second data type consisting of an even multiple of data words.

SUMMARY OF THE INVENTION

Accordingly, the present invention provides a data processing apparatus, wherein in a first mode of operation, data of a first data type is processed, and in a second mode of operation, data of a second data type consisting of an even multiple of data words is processed, the data processing apparatus comprising: a register bank having a plurality of data slots for storing data words of data of said first type data and data words of data of said second type data; transfer logic, responsive to a store instruction, to control the storing of the data words in the register bank to a memory; a format register for storing format data indicating the distribution in the register bank of data words of data of said first data type and data words of data of said second data type; in said second mode, the transfer logic being responsive to said store instruction specifying an even number of data words to cause those data words to be stored from said register bank to said memory, and being responsive to said store instruction specifying an odd number of data words, to cause the format data from the format register to be stored to said memory along with an even number of data words from the register bank. In preferred embodiments, the data of the first data type consists of an odd multiple of data words.

In accordance with the present invention, a register bank is provided that has a plurality of data slots for storing data words, which may be data words of data of said first data type, or data words of data of said second data type. A format register is then provided for storing format data indicating the distribution in the register bank of data words of data of said first data type and said second data type. In situations where the data in the register bank needs to be temporarily stored to memory for subsequent retrieval into the register bank, for example in the event of a context switch event or as a result of procedure call entry and exit routines, then it becomes necessary to also store the format register to memory. However, this would typically require a further store instruction, which clearly has an impact on processing speed.

To avoid this problem, the present invention is arranged such that in said second mode, where data consisting of an even multiple of data words is processed, the transfer logic is responsive to the store instruction specifying an even number of data words to cause those data words to be stored from said register bank to said memory, and is responsive to said store instruction specifying an odd number of data words, to cause the format data from the format register to be stored to said memory along with an even number of data words from the register bank. Hence, in situations where the data in the register bank needs to be temporarily stored to memory for subsequent retrieval into the register bank, all that is required is for the store instruction to be issued in said second mode specifying an odd number of data words, and this will automatically cause the contents of the format register to be stored to memory in addition to the required even number of data words from the register bank.

Thus the present invention enables a single register bank to be used to store both data of a first data type and a second data type, and for information about the distribution of the data in the register bank to be selectively stored to memory as required, without increasing the number of instructions, and hence without adversely affecting processing speed during a store to memory or load from memory process.

If the code initiating the store instruction is aware of the register bank content, then there may be no need to store the format register contents to memory. However, in preferred embodiments, if the store instruction is initiated by code unaware of the register bank content, the store instruction is arranged to be issued in said second mode specifying an odd number of data words, upon receipt of the store instruction, said transfer logic being arranged to cause said format data from the format register to be stored to said memory in addition to said even number of data words from the register bank. Examples of code which would typically be unaware of the register bank content are context switch code and procedure call entry and exit routines.

In preferred embodiments, upon receipt of a subsequent load instruction issued in said second mode of operation and specifying an odd number of data words, the transfer logic is arranged to cause the format data to be loaded into the format register in addition to an even number of data words being loaded into the register bank. This enables the format data to be available for subsequent processes which may need to know the distribution in the register bank of data words of data of said first data type and data words of data of said second data type. Further, if the internal format of the data (i.e. the format in the register bank) differs from the external format (i.e. the format in memory), and the differences depend on the data type, then the data processing apparatus will have access to the information required to reload the data into the register bank from memory.

It will be appreciated that the data processing apparatus may include further registers in addition to the register bank and the format register. For example, in one embodiment, the register bank has an even number 'n' of data slots, and the apparatus further comprises one or more additional registers for storing additional information associated with the data processing apparatus, wherein if the store instruction is issued in said second mode specifying n+x data words, where x is odd, then said transfer logic is arranged to cause all n data words in the register bank to be stored to memory, in addition to the contents of one or more of the format register and additional registers.

In preferred embodiments, if x is 1, the transfer logic is arranged to cause all n data words in the register bank to be stored to memory, in addition to the format data in the format register. Further, in preferred embodiments, one of said additional registers is a control register, and if x has a first odd value other than 1, the transfer logic is arranged to cause all n data words in the register bank to be stored to memory, in addition to the format data in the format register and the contents of the control register.

As another example, one or more of said additional registers may be exception registers storing exception attributes, and if x is a second odd value other than 1, the transfer logic may be arranged to cause all n data words in the register bank to be stored to memory, in addition to the format data in the format register and the contents of the one or more exception registers. Similarly, if x is a third odd value other than 1, the transfer logic may be arranged to cause all n data words in the register bank to be stored to memory, in addition to the format data in the format register and the contents of all said additional registers. Clearly, other combinations of registers, other than those mentioned above, can be caused to be stored as a result of the store instruction specifying a predetermined particular value of 'x'.

In preferred embodiments, the data slots of the register bank are grouped into a plurality of logical regions, within each logical region, said data slots storing either data words of data of said first data type or data words of data of said second data type, and the format data indicating for each logical region which data type is associated with the data words stored in that logical region. The number of bits of data chosen to indicate the format data for each logical region is clearly a matter of design choice. However, assuming a logical region will either store data of said first data type or data of said second data type, then in preferred embodiments, it is only necessary to provide one bit of format data for each said logical region.

It will be appreciated that various types of data may be processed by the data processing apparatus of the present invention. However, in preferred embodiments, data of said first data type is single precision data. Further, in preferred embodiments, data of said second data type is double precision data.

In one preferred embodiment, data of said first data type is single precision data consisting of a single data word, data of said second data type is double precision data consisting of two data words, and said data slots are grouped into a plurality of logical regions, each logical region comprising two data slots, and within each logical region, said data slots storing either data words of said single precision data or data words of said double precision data.

In this embodiment, said format data is arranged to indicate for each logical region whether the data words stored in that logical region represent two items of single precision data, or one item of double precision data.

It will be appreciated that the register bank and transfer logic of the present invention may be provided in a number of different places within the data processing apparatus. For example, they may be located within a main processor, or may be provided as part of a separate coprocessor. In preferred embodiments, the data processing apparatus comprises a main processor and a coprocessor, the coprocessor comprising said register bank, said transfer logic and said format register, and the transfer logic being responsive to store and load instructions issued by the main processor. In this embodiment, upon a context switch event, the main processor is arranged to issue to the coprocessor a store instruction in said second mode specifying an odd number of data words.

Viewed from a second aspect, the present invention provides a method of operating a data processing apparatus having a first mode of operation where data of a first data type is processed and a second mode of operation where data of a second data type consisting of an even multiple of data words is processed, the method comprising the steps of storing in a register bank data words of data of said first type data and data words of data of said second type data, the register bank having a plurality of data slots for storing said data words; storing in a format register format data indicating the distribution in the register bank of data words of data of said first data type and data words of data of said second data type; in said second mode, responsive to a store instruction specifying an even number of data words, causing those data words to be stored to said memory; and in said second mode, responsive to said store instruction specifying an odd number of data words, causing the format data from the format register to be stored to said memory along with an even number of data words from the register bank.

BRIEF DESCRIPTION OF THE DRAWINGS

The present invention will be described further, by way of example only, with reference to preferred embodiments thereof as illustrated in the accompanying drawings in which.

DESCRIPTION OF A PREFERRED EMBODIMENT

Figure 1:
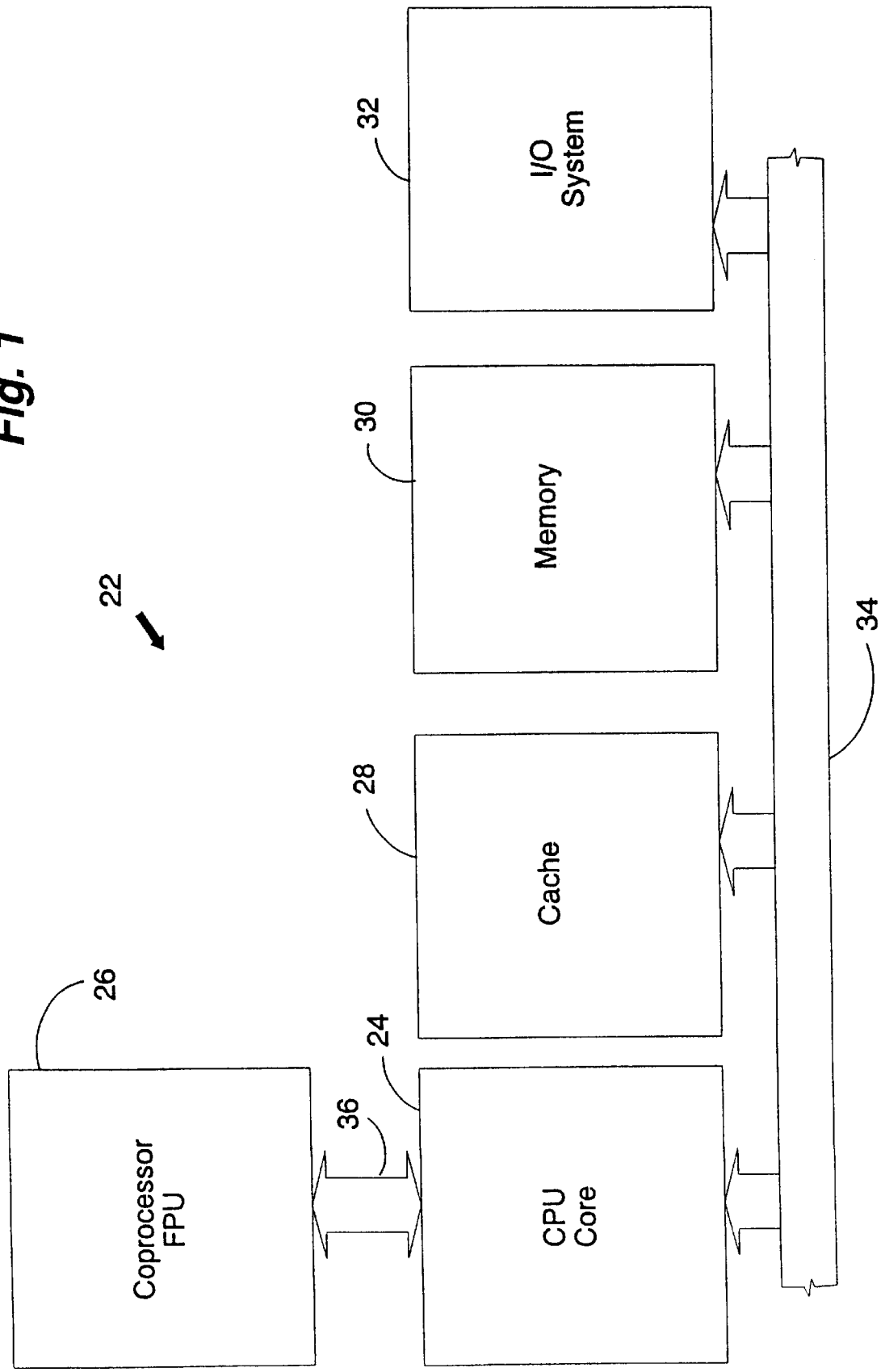
FIG. 1 schematically illustrates a data processing system.

FIG. 1 illustrates a data processing system 22 comprising a main processor 24, a floating point unit coprocessor 26, a cache memory 28, a main memory 30 and an input/output system 32. The main processor 24, the cache memory 28, the main memory 30 and the input/output system 32 are linked via a main bus 34. A coprocessor us 36 links the main processor 24 to the floating point unit coprocessor 26.

In operation, the main processor 24 (also referred to as the ARM core) executes a stream of data processing instructions that control data processing operations of a general type including interactions with the cache memory 28, the main memory 30 and the input/output system 32. Embedded within the stream of data processing instructions are coprocessor instructions. The main processor 24 recognises these coprocessor instructions as being of a type that should be executed by an attached coprocessor. Accordingly, the main processor 24 issues these coprocessor instructions on the coprocessor bus 36 from where they are received by any attached coprocessors. In this case, the floating point unit coprocessor 26 will accept and execute any received coprocessor instructions that it detects are intended for it. This detection is via a coprocessor number field within the coprocessor instruction.

Figure 2:
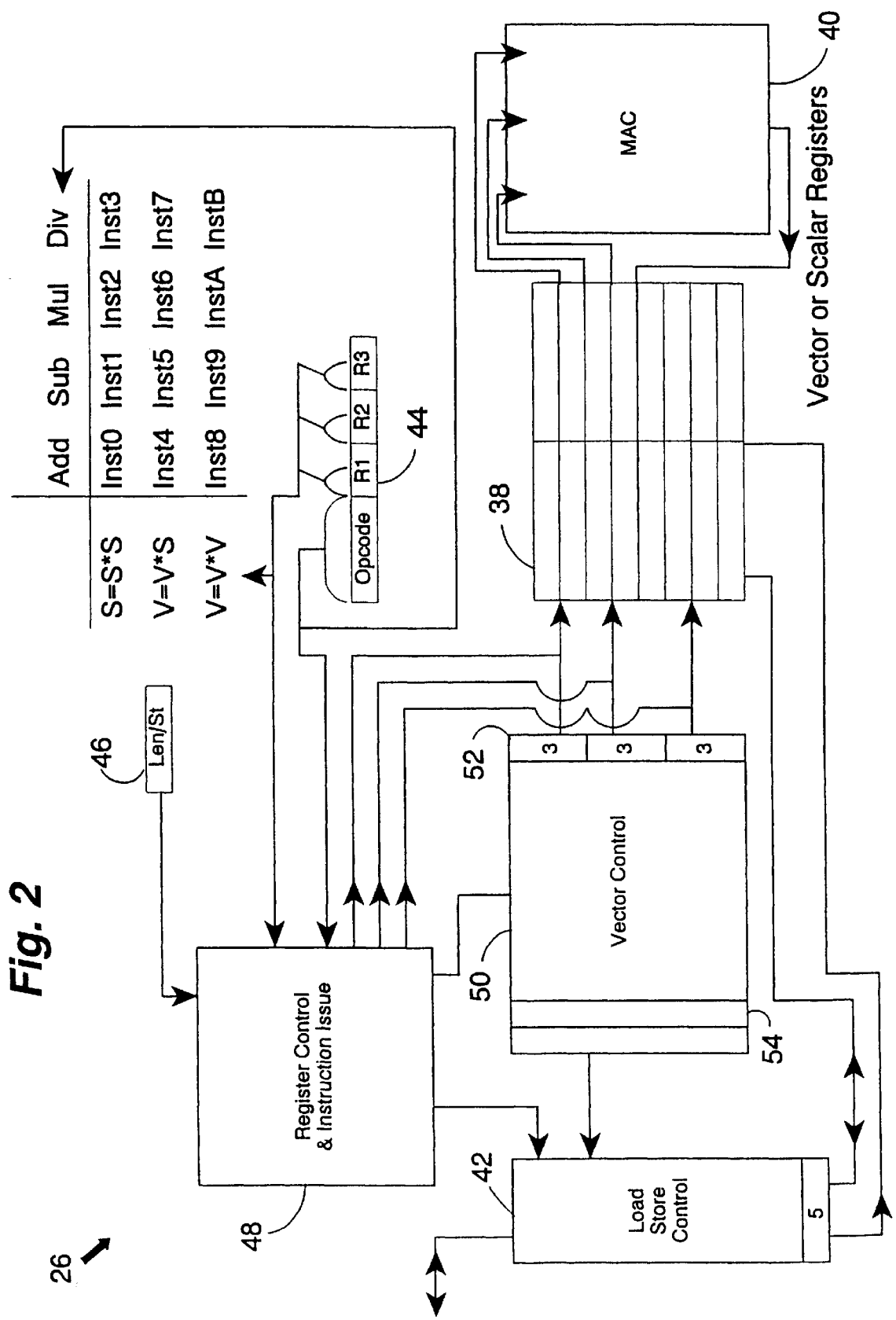
FIG. 2 illustrates a floating point unit supporting both scalar and vector registers.

FIG. 2 schematically illustrates the floating point unit coprocessor 26 in more detail. The floating point unit coprocessor 26 includes a register bank 38 that is formed of 32 32-bit registers (less shown in FIG. 2). These registers can operate individually as single precision registers each storing a 32-bit data value or as pairs that together store a 64-bit data value. Within the floating point unit coprocessor 26 there is provided a pipelined multiply accumulate unit 40 and a load store control unit 42. In appropriate circumstances, the multiply accumulate unit 40 and the load store control unit 42 can operate concurrently with the multiply accumulate unit 40 performing arithmetic operations (that include multiply accumulate operations as well as other operations) upon data values within the register bank 38 whilst the load store control unit 42 transfers data values not being used by the multiply accumulate unit 40 to and from the floating point unit coprocessor 26 via the main processor 24.

Within the floating point unit coprocessor 26, a coprocessor instruction that is accepted is latched within an instruction register 44. The coprocessor instruction can in this simplified view be considered to be formed of an opcode portion followed by three register specifying fields R1, R2 and R3 (in fact these fields may be split and spread around differently within a fill instruction). These register specifying fields R1, R2 and R3 respectively correspond to the registers within the register bank 38 that serve as the destination, first source and second source for the data processing operation being performed. A vector control register 46 (which may be part of a larger register serving additional functions) stores a length value and a stride value for the vector operations that may be performed by the floating point unit coprocessor 26. The vector control register 46 may be initialised and updated with length and stride values in response to a vector control register load instruction. The vector length and stride values apply globally within the floating point unit coprocessor 26 thereby allowing these values to be dynamically altered on a global basis without having to resort to self-modifying code.

A register control and instruction issue unit 48, the load store control unit 42 and a vector control unit 50 can together be considered to perform a main part of the role of instruction decoder. The register control and instruction issue unit 48 is responsive to the opcode and the three register specifying fields R1, R2 and R3 and first outputs the initial register access (address) signals to the register bank 38 without performing any decode upon the opcode or needing to use the vector control unit 50. Having direct access to the initial register values in this way assists in achieving a faster implementation. If a vector register is specified, then the vector control unit 50 serves to generate the necessary sequence of register access signals using 3-bit incrementers (adders) 52. The vector control unit 50 is responsive to the length value and the stride value stored within the vector control register 46 in performing its addressing of the register bank 38. A register scoreboard 54 is provided to perform register locking such that the pipelined multiply accumulate unit 40 and concurrently operating load store control unit 42 do not give rise to any data consistency problems (the register scoreboard 54 may alternatively be considered to be part of the register control and instruction issue unit 48).

The opcode within the instruction register 44 specifies the nature of the data processing operation to be performed (e.g. whether the instruction is an add, subtract, multiply, divide, load, store . . . etc.). This is independent of the vector or scalar nature of the register being specified. This further simplifies the instruction decoding and set-up of the multiply accumulate unit 40. The first register specifying value R1 and the second register specifying value R2 together encode the vector/scalar nature of the operation specified by the opcode. The three common cases supported by the encoding are S=S*S (e.g. basic random maths as generated by a C compiler from a block of C code), V=V op S (e.g. to scale the elements of a vector) and V=V op V (e.g. matrix operations such as FIR filters and graphics transformations) (note that in this context a "op" indicates a general operation and the syntax is of the form destination=second operand op first operand). It should also be understood that some instructions (e.g. a compare, a compare with zero or an absolute value) may have no destination registers (e.g. outputs are the condition flags) or fewer input operands (a compare with zero has only one input operand). In these cases there is more opcode bit space available to specify options such as vector/scalar nature and the full range of registers could be made available for each operand (e.g. compares may always be fully scalar whatever the register).

The register control and instruction issue unit 48 and the vector control unit 50 that together perform the main part of the role of instruction decoder are responsive to the first register specifying field R1 and the second register specifying field R2 to determine and then control the vector/scalar nature of the data processing operation specified. It will be noted that if the length value stored within the vector control register 46 indicates a length of one (corresponding to a stored value of zero), then this can be used as an early indication of a purely scalar operation.

Figure 3:
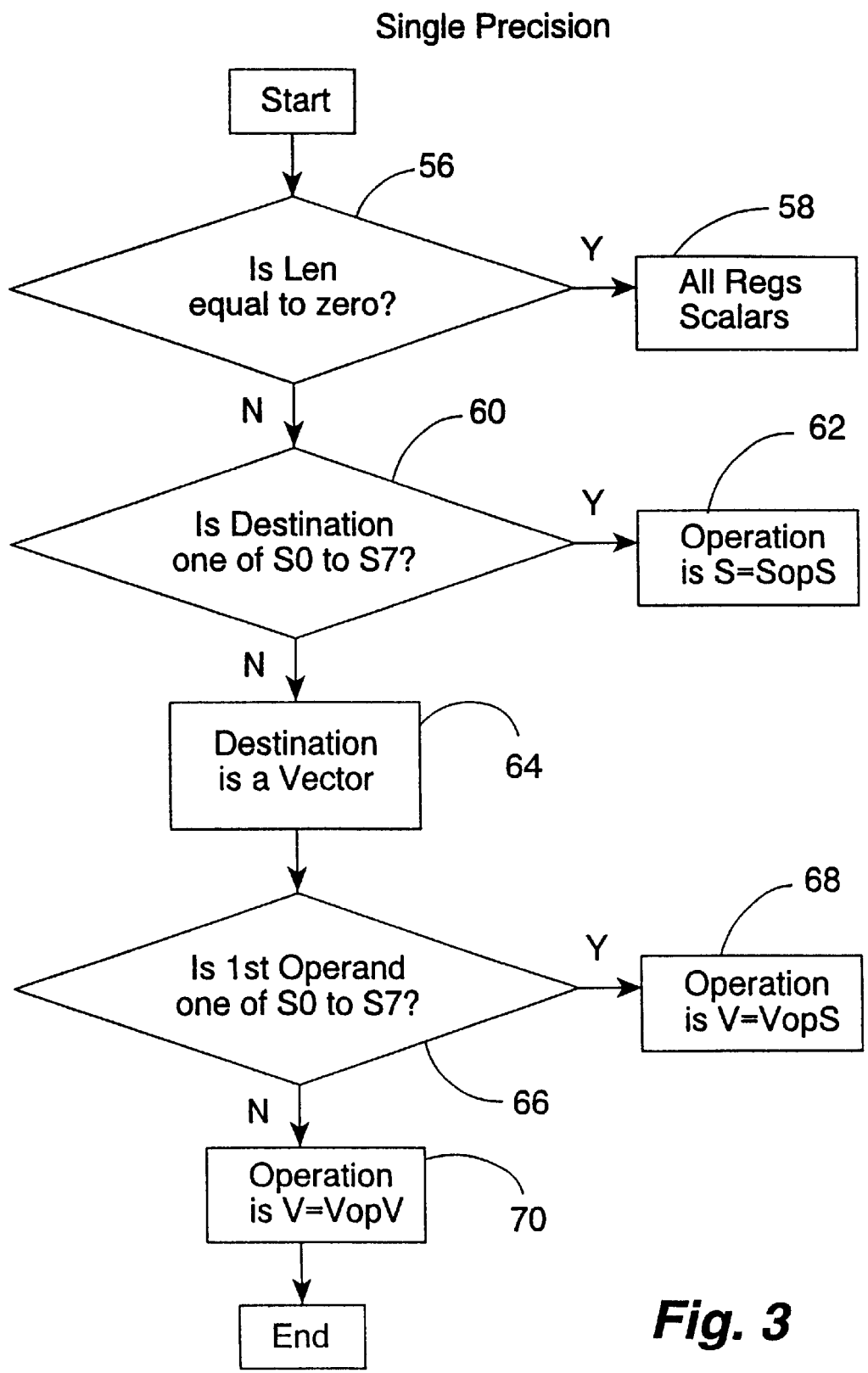
FIG. 3 is a flow diagram illustrating how, for single precision operation, it is determined whether a given register is a vector or scalar register.

FIG. 3 shows a flow diagram indicating the processing logic used to decode the vector/scalar nature from the register specifying values in single precision mode. At step 56 a test is made as to whether the vector length is globally set as one (length value equals zero). If the vector length is one, then all registers are treated as scalars in step 58. At step 60, a test is made as to whether the destination register R1 is within the range S0 to S7. If this is the case, then the operation is all scalar and is of the form S=S op S, as is indicated in step 62. If step 60 returns a no, then the destination is determined to be a vector, as indicated at step 64. If the destination is a vector, then the encoding takes the second operand as also being a vector. Accordingly, the two possibilities remaining at this stage are V=V op S and V=V op V. These to options are distinguished between by the test at step 66 that determines whether the first operand is one of S0 to S7. If this is the case, then the operation is V=V op S, else the operation is V=V op V. These states are recognised in steps 68 and 70 respectively.

It should be noticed that when the vector length is set to one, then all of the 32 registers of the register bank 38 are available to be used as scalars since the scalar nature of the operation will be recognised at step 58 without having to rely upon the test of step 60 that does limit the range of registers that may be used for the destination. The test of step 60 is useful in recognising an all scalar operation when mixed vector and scalar instructions are being used. It will also be noticed that when operating in a mixed vector and scalar mode, if the first operand is a scalar, then it may be any of S0 to S7, whilst if the first operand is a vector, then it may be any of S8 to S31. Providing three times the number of registers to be available within the register bank for the first operand being a vector is an adaptation to the generally greater number of registers needed to hold sequences of data values when using vector operations.

It will be appreciated that a common operation one may wish to perform is a graphics transformation. In the general case, the transformation to be performed may be represented by a 4*4 matrix. The operand reuse in such calculations means that it is desirable that the matrix values be stored in registers that may be manipulated as vectors. In the same way, an input pixel value is usually stored in 4 registers that again should be able to be manipulated as a vector to aid reuse. The output of the matrix operation will usually be scalars (accumulating the separate vector line multiplies) stored in 4 registers. If it is desired to double pump the input and output values, then you arrive at a requirement for 24 (16+4+4) vector registers and 8 (4+4) scalar registers.

Figure 4:
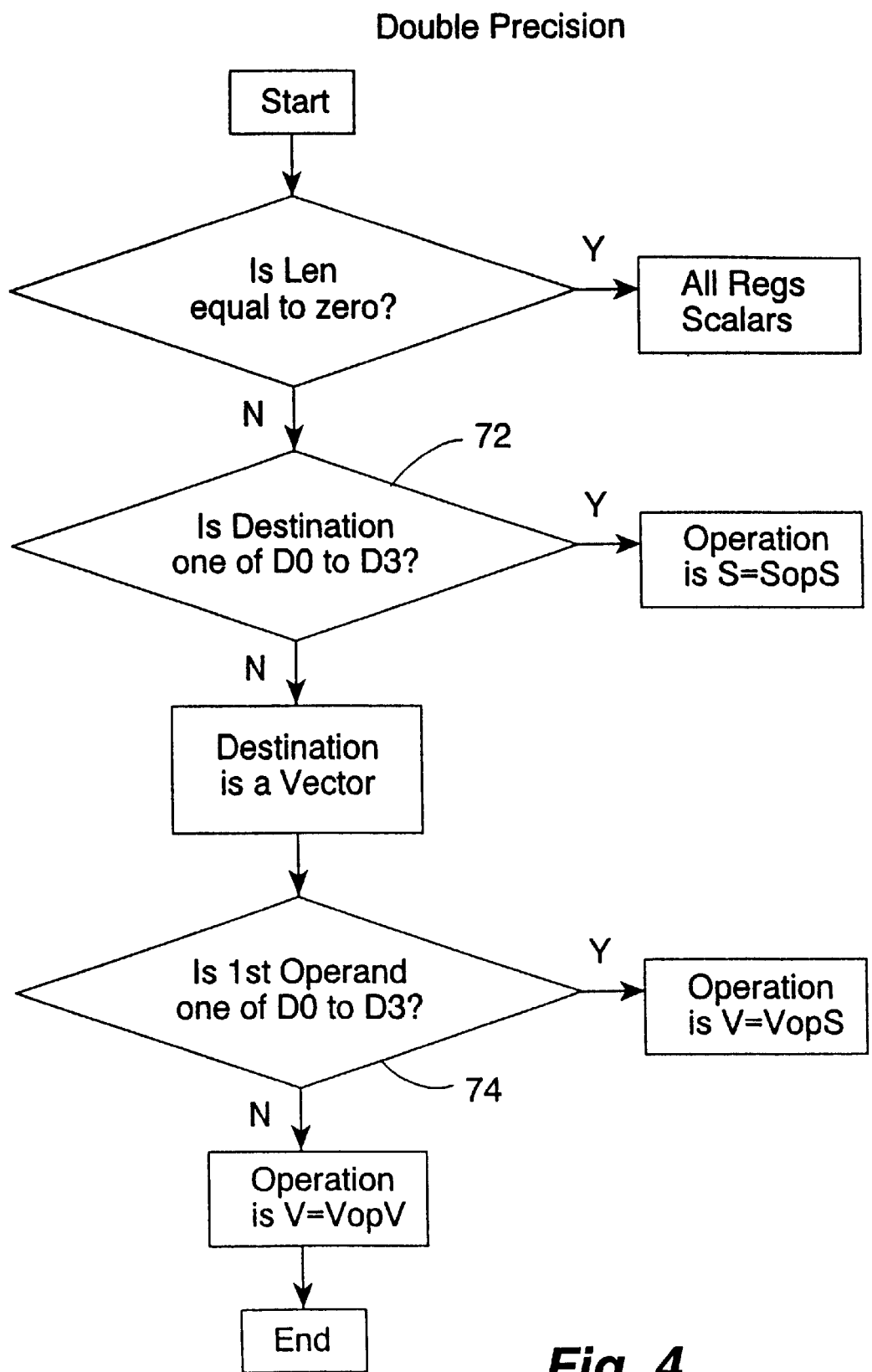
FIG. 4 is a flow diagram illustrating how, for double precision operation, it is determined whether a given register is a vector or a scalar.

FIG. 4 is a flow diagram corresponding to that of FIG. 3, but in this case illustrating double precision mode. As previously mentioned, in double precision mode the register slots within the register bank 38 act as pairs to store 16 64-bit data values in logical registers D0 to D15. In this case, the encoding of the vector/scalar nature of the registers is modified from that of FIG. 3 in that the tests of steps 60 and 66 now become "Is the destination one of D0 to D3?" and "Is the first operand one of D0 to D3?" at steps 72 and 74 respectively.

Whilst encoding the vector/scalar nature of the registers within the register specifying fields as described above provides a significant saving in instruction bit space, it does cause some difficulties for non-commutative operations such as subtract and division. Given the register configuration V=V op S, the lack of symmetry between the first and second operands for non-commutative operations can be overcome without additional instructions swapping register values by extending the instruction set to include pairs of opcodes such as SUB, RSUB and DIV, RDIV that represent the two different operand options for non-commutative operations.

Figure 5:
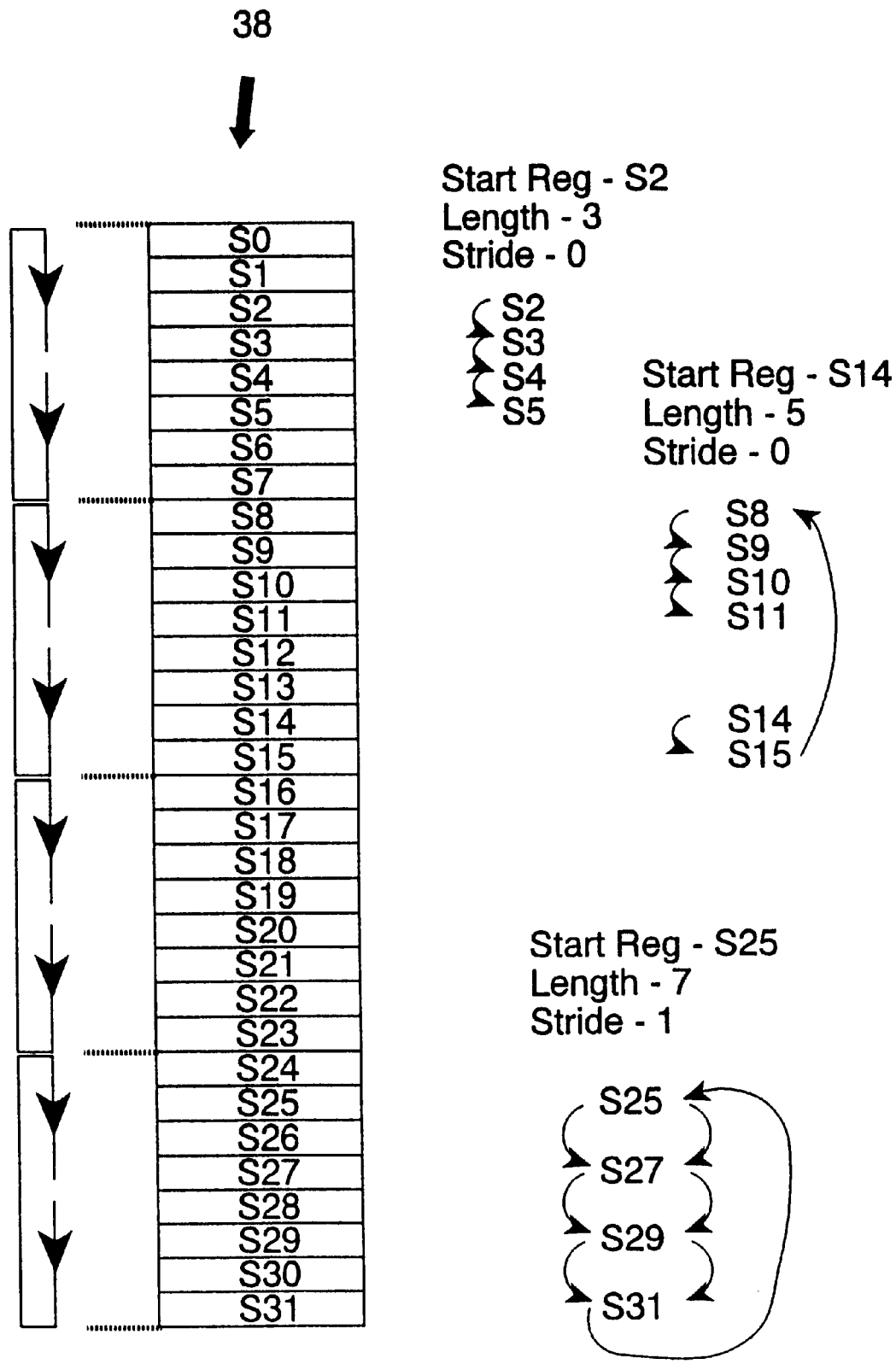
FIG. 5 illustrates the division of the register bank into subsets with wrapping within each subset during single precision operation.

FIG. 5 illustrates the wrapping of vectors within subsets of the register bank 38. In particular, in single precision mode the register bank is split into 4 ranges of registers with addresses S0 to S7, S8 to S15, S16 to S23 and S24 to S31. These ranges are disjoint and contiguous. Referring to FIG. 2, the wrapping function for these subsets containing eight registers may be provided by employing 3-bit incrementers (adders) 52 within the vector control unit 50. In this way, when a subset boundary is crossed, the incrementers will wrap back. This simple implementation is facilitated by the alignment of the subsets on eight word boundaries within the register address space.

Returning to FIG. 5, a number of vector operations are illustrated to assist understanding of the wrapping of the registers. The first vector operation specifies a start register S2, a vector length of 4 (indicated by a length value within the vector control register 46 of 3) and a stride of one (indicated by a stride value within the vector control register 46 of zero). Accordingly, when an instruction is executed that is decoded to refer to register S2 as a vector with these global vector control parameters set, then the instruction will be executed 4 times respectively using the data values within the registers S2, S3, S4 and S5. As this vector does not cross a subset boundary, there is no vector wrapping.

In the second example, the starting register is S14, the length is 6 and the stride is one. This will result in the instruction being executed 6 times starting with register S14. The next register used will be S15. When the register increments by the stride again, then instead of the register used being S16, it will wrap to be register S8. The instruction is then executed further 3 times to complete the full sequence of S14, S15, S8, S9, S10 and S11.

The final example of FIG. 5 shows a starting register of S25, a length of 8 and a stride of 2. The first register used will be S25 and this will be followed by S27, S29 and S31 in accordance with the stride value of 2. Following the use of register S31, the next register value will wrap back to the start of the subset, pass over register S24 in view of the stride of 2, and execute the operation using register S25. The incrementers 52 can take the form of 3-bit adders that add the stride to the current value when moving between vector registers. Accordingly, the stride can be adjusted by supplying a different stride value to the adder.

Figure 6:
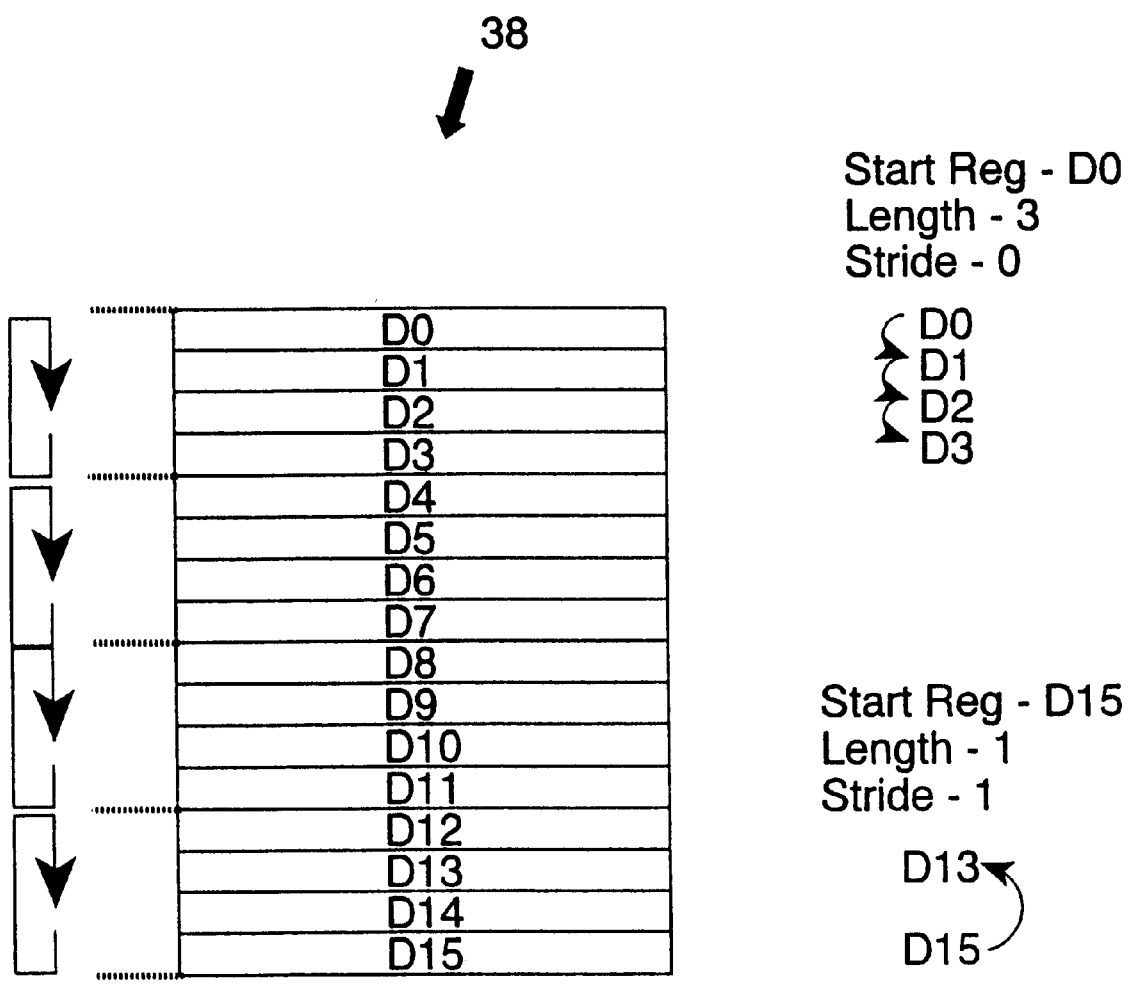
FIG. 6 illustrates the division of the register bank into subsets with wrapping within each subset during double precision operation.

FIG. 6 illustrates the wrapping of the register bank 38 within double precision mode. In this mode, the subsets of registers comprises D0 to D3, D4 to D7, D8 to D11 and D12 to D15. The minimum value input to the adder serving as the incrementer 52 in double precision mode will be 2—corresponding to a double precision stride of one. A double precision stride of two will require an input of 4 to the adder. The first example illustrated in FIG. 6 has a start register of D0, a length of 4 and a stride one. This will result in a vector register sequence of D0, D1, D2 and D3. As no subset boundaries are crossed, there is no wrapping in this example. In the second example, the start register is D15, the length is 2 and the stride is 2. This results in a vector register sequence of D15 and D13.

Referring to FIG. 2, it will be noted the load store control unit 42 has a 5-bit incrementer at its output and that load/store multiple operations are not subject to the register wrapping applied to vector operations. This enables a single load/store multiple instruction to access as many consecutive registers as it requires.

An example of an operation that makes good use of this wrapping arrangement is an FIR filter split into units of 4 signal values and 4 taps. If the syntax R8–R11 op R16–R19 represents the vector operations R8opR16, R9opR17, R10opR18 and R11opR19, then the FIR filter operation may be performed as:

Load 8 taps in R8–R15 and 8 signal values into R16–R23

R8–R11opR16–R19 and put results into R24–R27
R9–R12opR16–R19 and accumulate the results into R24–R27
R10–R13opR16–R19 and accumulate the results into R24–R27
R11–R14opR16–R19 and accumulate the results into R24–R27

Reload R8–R11 with new taps

R12–R15opR16–R19 and accumulate the results into R24–R27
R13–R8opR16–R19 and accumulate the results into R24–R27 (R15–>R8 wrap)
R14–R9opR16–R19 and accumulate the results into R24–R27 (R15–>R8 wrap)
R15–R10opR16–R19 and accumulate the results into R24–R27 (R15–>R8 wrap)

Reload R12 to R15 with new taps

When out of taps, reload R16–R19 with new data

R12–R15opR20–R23 and put results in R28–R31
R13–R8opR20–R23 and accumulate results into R8–R31 (R15–>R8 wrap)
R14–R9opR20–R23 and accumulate results into R28–R31 (R15–>R8 wrap)
R15–R10opR20–R23 and accumulate results into R28–R31 (R15–>R8 wrap)

The rest as above.

It should be noted from the above that the loads are to different registers from the multiple accumulates and so can take place in parallel (i.e. achieves double buffering).

Figure 7A:
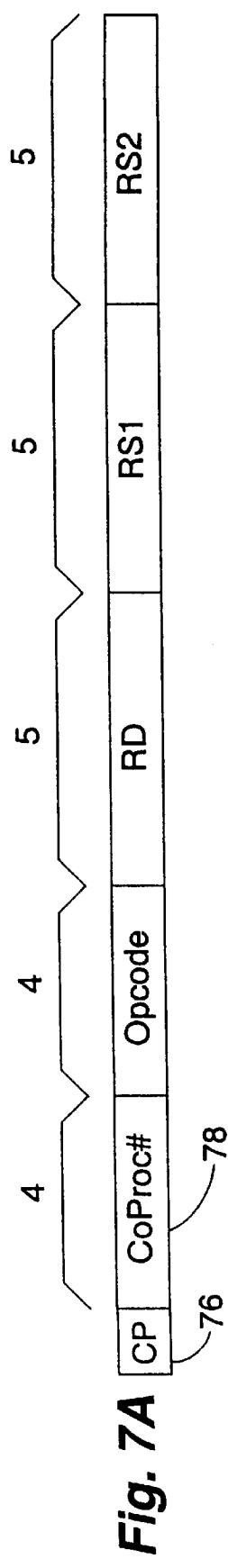
FIGS. 7A to 7C illustrate a main processor view of a coprocessor instruction, a single and double precision coprocessor view of the coprocessor instruction and a single precision coprocessor view of the coprocessor instruction respectively.

FIG. 7A schematically illustrates how the main processor 24 views a coprocessor instruction. The main processor uses a bit combination of a field 76 (which may be split) within the instruction to identify the instruction as a coprocessor instruction. Within standard ARM processor instruction set, a coprocessor instruction includes a coprocessor number field 78 that the coprocessor(s) attached to the main processor use to identify if a particular coprocessor instruction is targeted at them. Different types of coprocessor, such as a DSP coprocessor (e.g. the Piccolo coprocessor produced by ARM) or a floating point unit coprocessor, can be allocated different coprocessor numbers and so separately addressed within a single system using the same coprocessor bus 36. The coprocessor instructions also include an opcode that is used by the coprocessor and three 5-bit fields respectively specifying the destination, first operand and second operand from among the coprocessor registers. In some instructions, such as a coprocessor load or store, the main processor at least partially decodes the coprocessor instruction such that the coprocessor and main processor can together complete the desired data processing operation. The main processor may also be responsive to the data type encoded within the coprocessor number as part of the instruction decode it performs in such circumstances.

Figure 7B:
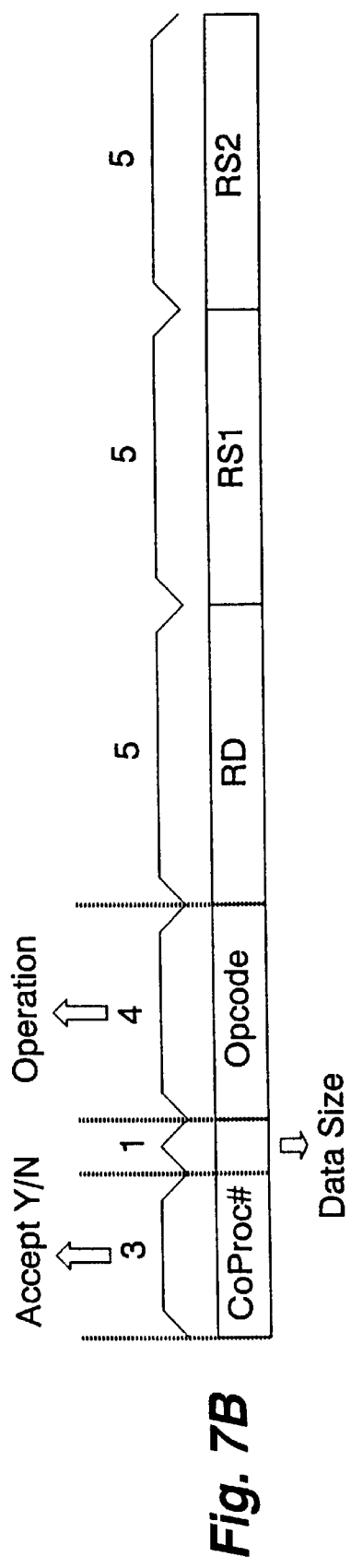

FIG. 7B illustrates how a coprocessor supporting both double and single precision operations interprets a coprocessor instruction it receives. Such a coprocessor is allocated two adjacent coprocessor numbers and uses the most significant 3 bits of the coprocessor number to identify whether it is the target coprocessor. In this way, the least significant bit of the coprocessor number is redundant for the purpose of identifying the target coprocessor and can instead be used to specify the data type to be used in executing that coprocessor instruction. In this example, the data type corresponds to the data size being either single or double precision.

It can be noted that whilst in double precision mode, the number of registers is effectively reduced from 32 to 16. Accordingly, it would be possible to decrease the register field size, but in that case the decode of which register to use would not be available directly from a self-contained field in a known position within the coprocessor instruction and would be dependent upon the decoding of other portions of the coprocessor instruction. This would disadvantageously complicate and possibly slow the operation of the coprocessor. Using the least significant bit of the coprocessor number to encode the data type means that the opcode can be completely independent of data type which also simplifies and speeds its decode.

Figure 7C:
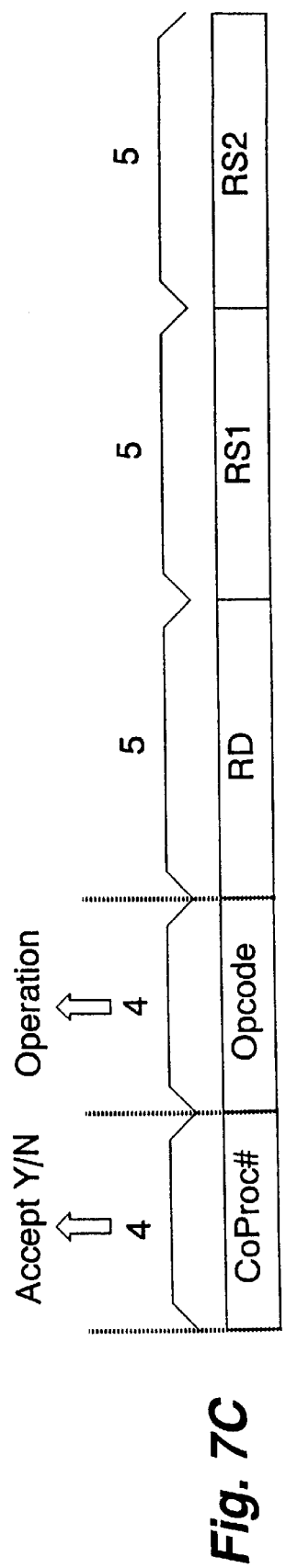

FIG. 7C illustrates how a coprocessor supporting only a single data type that is a subset of the data types supported by the FIG. 7B coprocessor interpreters the coprocessor instructions. In this case, the full coprocessor number is used to determine whether or not to accept the instruction. In this way, if a coprocessor instruction is of a data type not supported, then it corresponds to a different coprocessor number and will not be accepted. The main processor 24 can then fall back on undefined instruction exception handling to emulate the operation on the unsupported data type.

Figure 8:
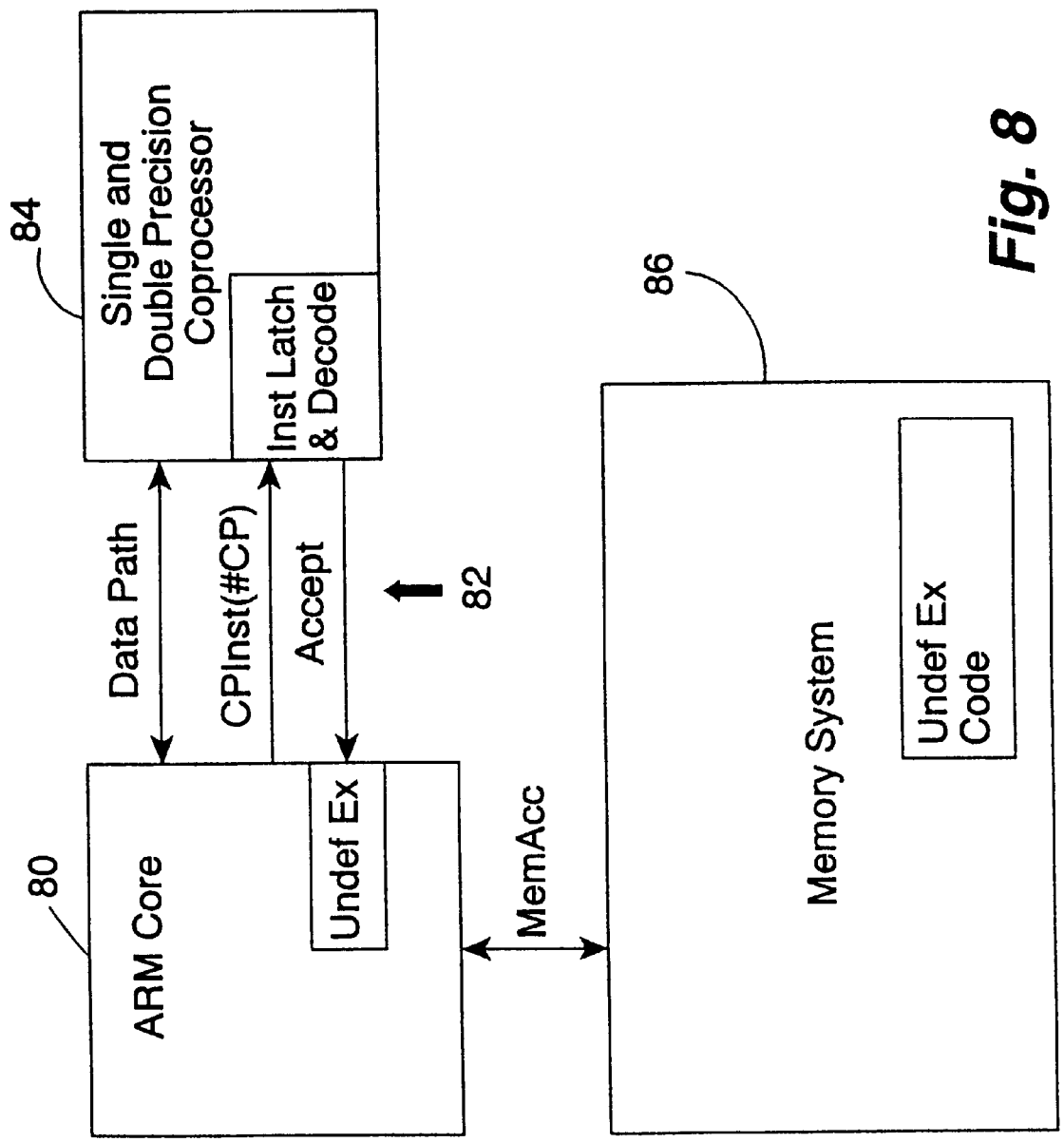
FIG. 8 illustrates a main processor controlling a single and double precision coprocessor.

FIG. 8 illustrates a data processing system comprising an ARM core 80 serving as a main processor and communicating via a coprocessor bus 82 with a coprocessor 84 that supports both single and double precision data type. The coprocessor instruction, including the coprocessor number, is issued from the ARM core 80 on the coprocessor bus 82 when it is encountered within the instruction stream. The coprocessor 84 then compares the coprocessor number with its own numbers and if a match occurs issues an accept signal back to the ARM core 80. If no accept signal is received, then the ARM core recognises an undefined instruction exception and refers to exception handling code stored in the memory system 86.

Figure 9:
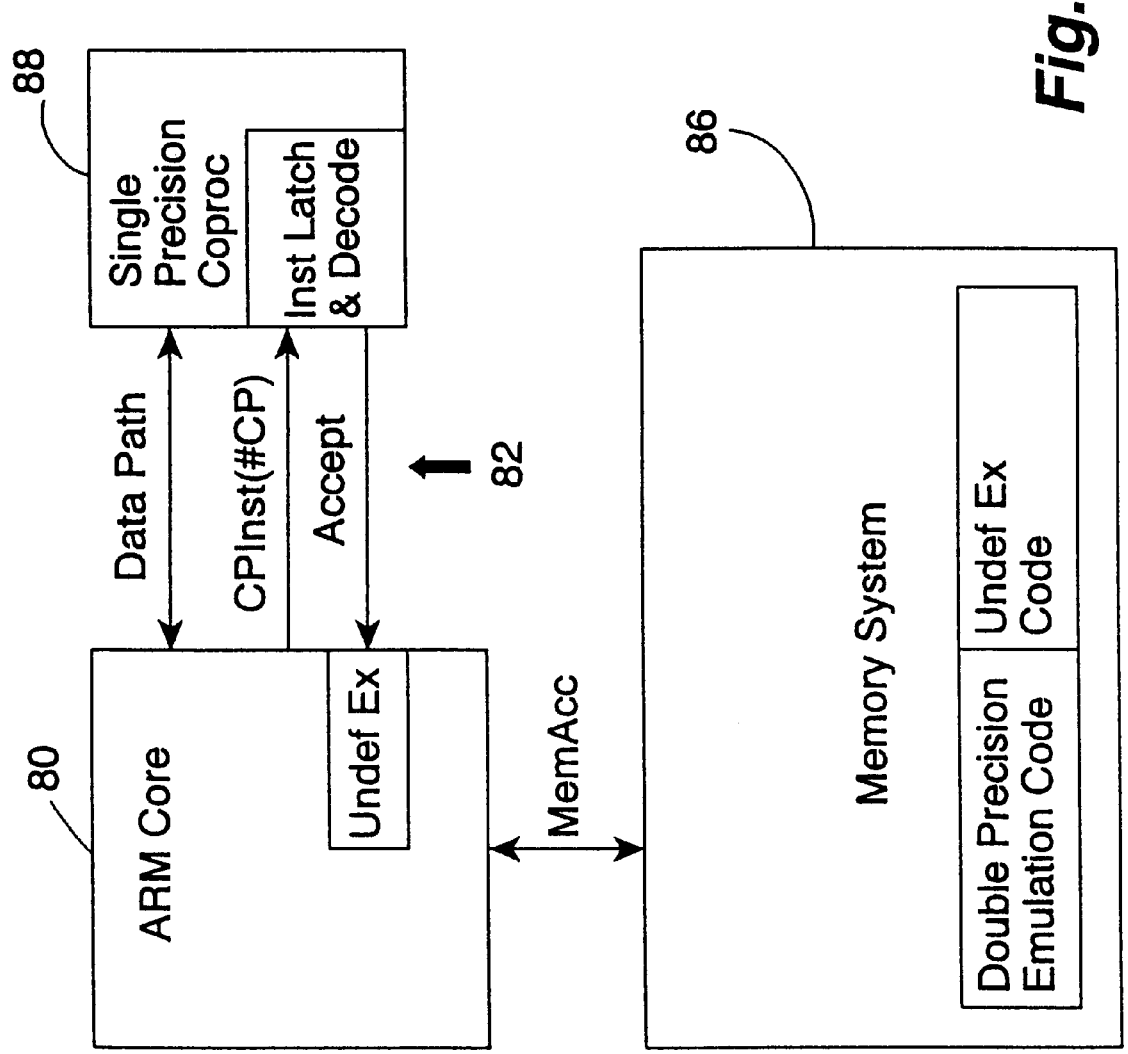
FIG. 9 illustrates the main processor controlling a single precision coprocessor.

FIG. 9 illustrates the system of FIG. 8 modified by replacing the coprocessor 84 with a coprocessor 88 that supports only single precision operations. In this case the coprocessor 88 recognises only a single coprocessor number. Accordingly, double precision coprocessor instructions within the original instruction stream that would be executed by the coprocessor 84 of FIG. 8 are not accepted by the single precision coprocessor 88. Thus, if it is desired to execute the same code, then the undefined exception handling code within the memory system 86 can include a double precision emulation routine.

It will be noted that whilst the need to emulate double precision instructions will make the execution of these instructions slow, the single precision coprocessor 88 can be smaller and less expensive than the double precision equivalent 84 and a net benefit gained if double position instructions are sufficiently rare.

Figure 10:
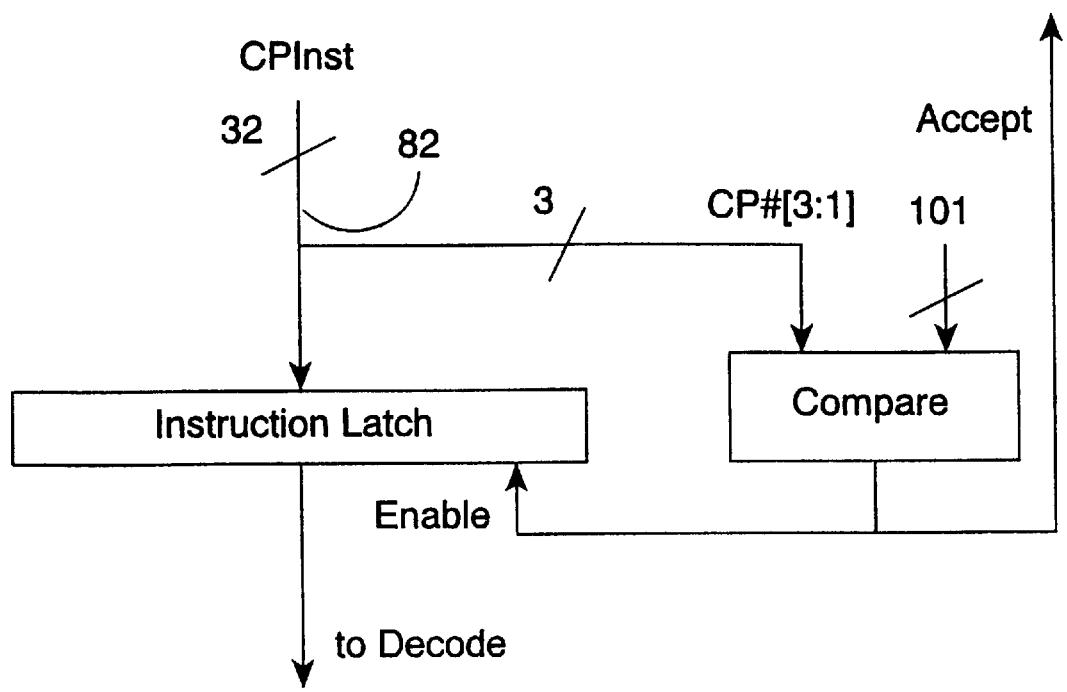
FIG. 10 illustrates the circuit within the single and double precision coprocessor that determines whether an accept signal should be returned to the main processor for a received coprocessor instruction.

FIG. 10 illustrates the instruction latch circuit within the coprocessor 84 that supports both single and double precision instructions and has two adjacent coprocessor numbers. In this case, the most significant 3 bits CP#[3:1] of the coprocessor number within the coprocessor instruction are compared with those allocated for that coprocessor 84. In this example, if the coprocessor 84 has coprocessor numbers 10 and 11, then this comparison can be achieved by matching the most significant the bits of the coprocessor number CP#[3:1] against binary 101. If a match occurs, then an accept signal is returned to the ARM core 80 and the coprocessor instruction is latched for execution.

Figure 11:
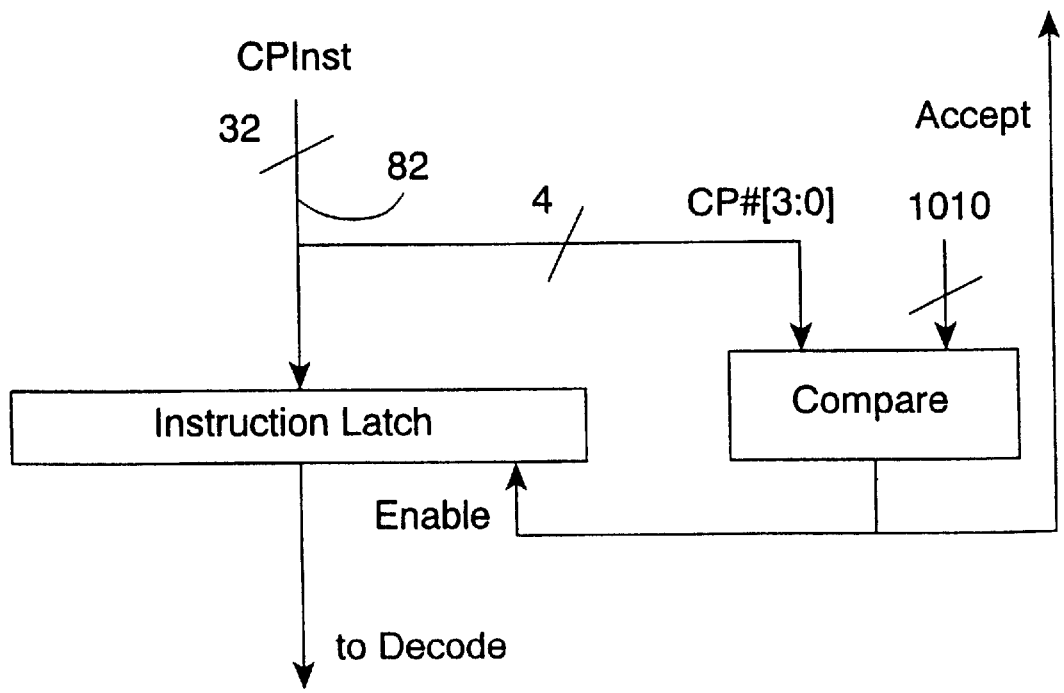
FIG. 11 illustrates the circuit within the single precision coprocessor that determines whether an accept signal should be returned to the main processor for a received coprocessor instruction.

FIG. 11 illustrates the equivalent circuit within the single precision coprocessor 88 of FIG. 9. In this case only a single coprocessor number will be recognised and single precision operations used by default. The comparison made in determining whether to accept and latch the coprocessor instruction is between the full 4 bits of the coprocessor number CP#[3:0] and the single embedded coprocessor number of binary 1010.

Figure 12:
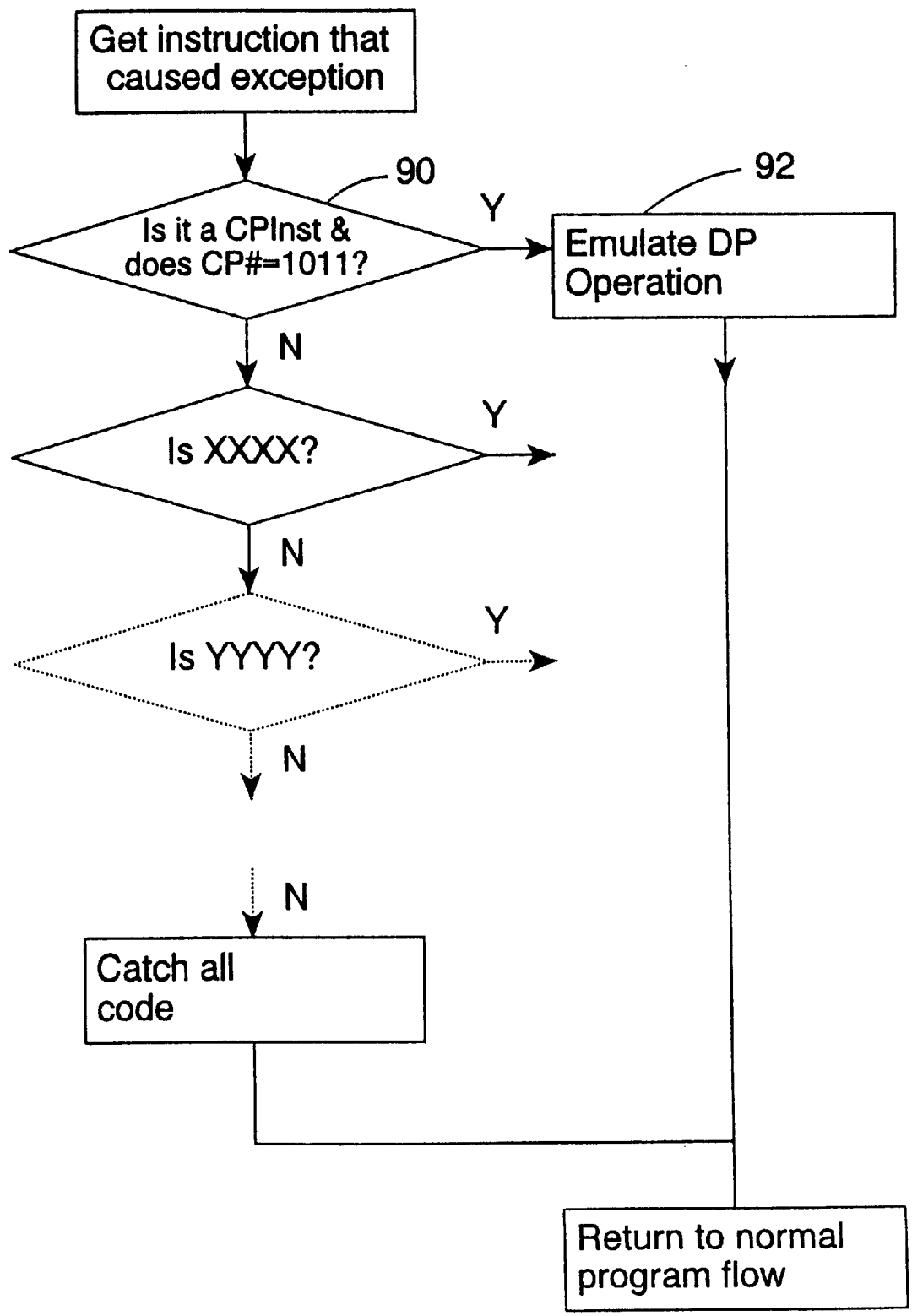
FIG. 12 illustrates undefined instruction exception handling within the main processor.

FIG. 12 is a flow illustrating how the undefined exception handling routine of the FIG. 9 embodiment may be triggered to run the double precision emulation code. This is achieved by detecting (step 90) if the instruction that gave rise to the undefined instruction exception is a coprocessor instruction with a coprocessor number of binary 1011. If yes, then this was intended as a double precision instruction and so can be emulated at step 92 before returning to the main program flow. Other exception types may be detected and handled by further steps if not trapped by step 90.

Figure 13:
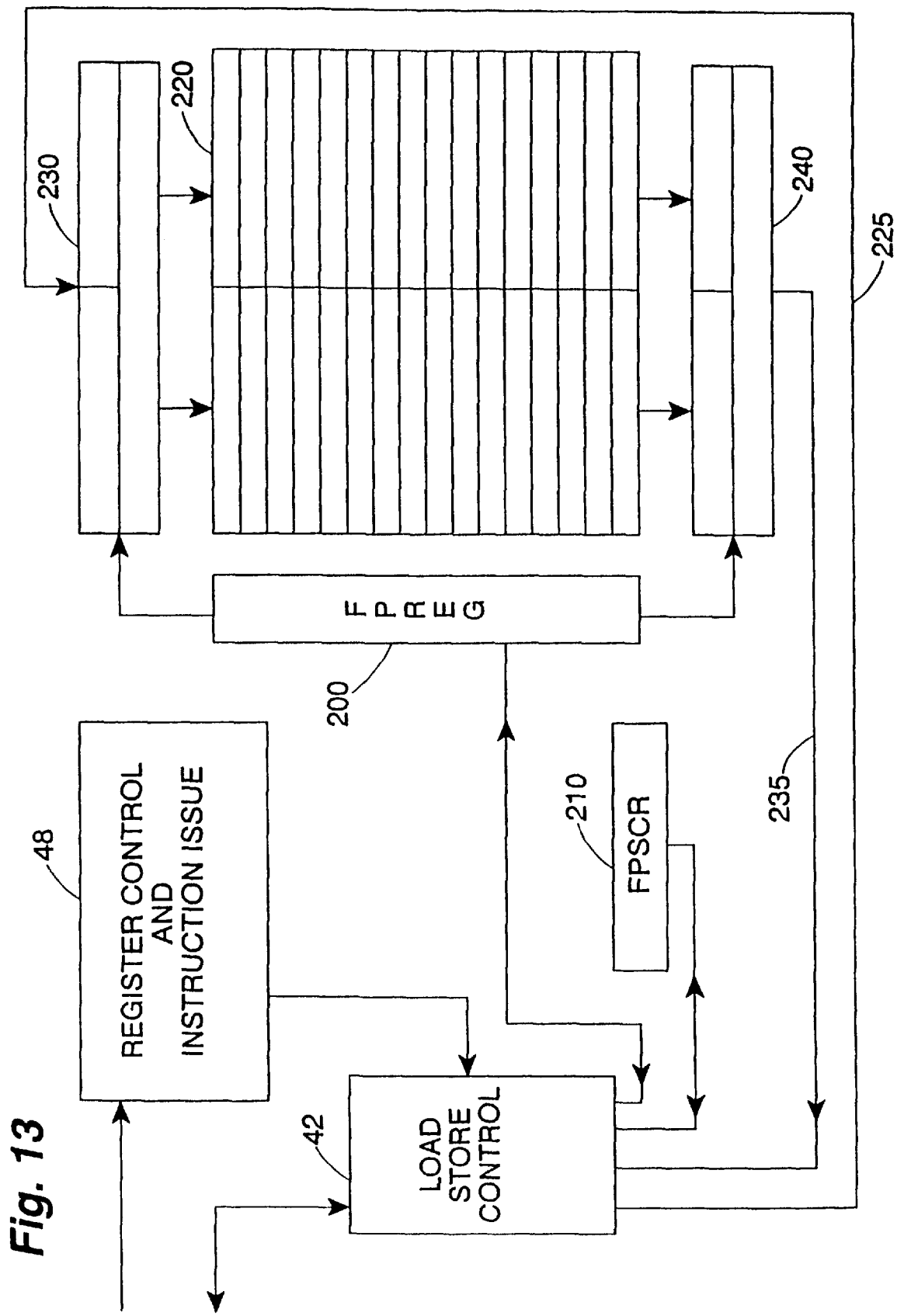
FIG. 13 is a block diagram illustrating elements of a coprocessor in accordance with preferred embodiments of the present invention.

FIG. 13 illustrates the use of a format register, FPREG 200, to store information identifying the type of data stored in each 32-bit register, or data slot, of the register bank 220. As mentioned earlier, each data slot can operate individually as a single precision register for storing a 32-bit data value (a data word), or can be paired with another data slot to provide a double precision register for storing a 64-bit data value (2 data words). In accordance with preferred embodiments of the present invention, the FPREG register 200 is arranged to identify whether any particular data slot has single precision or double precision data stored therein.

As illustrated in FIG. 13, the 32 data slots in the register bank 220 are arranged to provide 16 pairs of data slots. If a first data slot has a single precision data value stored therein, then in preferred embodiments the other data slot in that pair will be arranged to only store a single precision data value, and will not be linked with any other data slot in order to store a double precision data value. This ensures that any particular pair of data slots is arranged to store either two single precision data values, or one double precision data value. This information can be identified by a single bit of information associated with each pair of data slots in the register bank 220, and hence in preferred embodiments the FPREG register 200 is arranged to store 16 bits of information to identify the type of data stored in each pair of data slots of the register bank 220. It will be appreciated that the register FPREG 200 can hence be embodied as a 16-bit register, or, for consistency with other registers within the FPU coprocessor 26, can be embodied as a 32-bit register having 16 spare bits of information.

Figure 15:
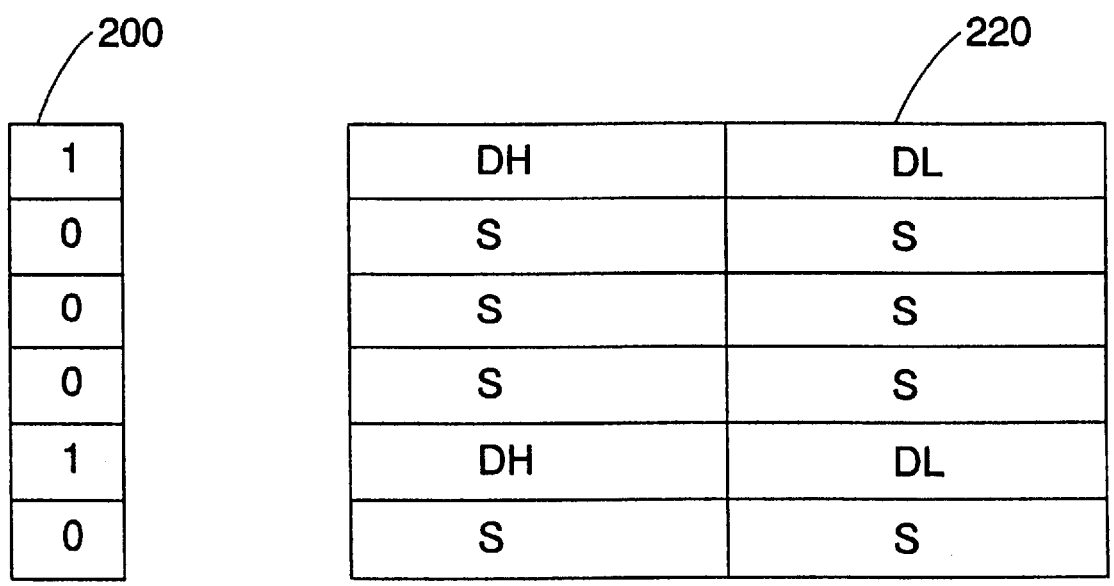
FIG. 15 provides an example of the contents of the floating point register in accordance with preferred embodiments of the present invention.

FIG. 15 illustrates six pairs of data slots within the register bank 220, which can in accordance with preferred embodiments be used to store six double precision data values or twelve single precision data values. An example of data which may be stored within these data slots is shown in FIG. 15, DH representing the 32 most significant bits of a double precision data value, DL indicating the 32 lowest significant bits of a double precision data value, and S representing a single precision data value.

The corresponding entries within the FPREG register 200 in accordance with preferred embodiments of the present invention are also illustrated in FIG. 15. In accordance with the preferred embodiment, the value "1" is stored in the FPREG register 200 to indicate that the associated pair of data slots contains a double precision data value, and the value "0" is used to indicate that at least one of the corresponding pair of data slots contains a single precision data value, or that both data slots are uninitialised. Hence, if both data slots are uninitialised, if one of the data slots is uninitialised and the other data slot in the pair contains a single precision data value, or if both data slots in the pair contain a single precision data value, then a logic "0" value will be stored in the corresponding bit of the FPREG register 200.

As mentioned earlier, the FPU coprocessor 26 of preferred embodiments may be used to process either single precision or double precision data values, and coprocessor instructions issued by the main processor 24 will identify whether any particular instruction is a single precision or a double precision instruction (see FIG. 7B and associated description). If an instruction is accepted by the coprocessor, it will be passed to the register control and instruction issue unit 48 for decoding and execution. If the instruction is a load instruction, the register control and instruction issue logic 48 will instruct the load store control unit 42 to retrieve the identified data from memory, and to store that data in the specified data slots of the register bank 220. At this stage, the coprocessor will know whether single precision or double precision data values are being retrieved, and the load store control unit 42 will act accordingly. Hence, the load store control logic 42 will either pass 32-bit single precision data values, or 64-bit double precision data values, over path 225 to the register bank input logic 230 for storing in the register bank 220.

In addition to the data being loaded by the load store control unit 42 into the register bank 220, data is also provided to the format register FPREG 200 to enable the necessary bits of information to be added to identify whether each pair of data slots receiving data is storing single precision or double precision data. In preferred embodiments, this data is stored in the format register FPREG 200 before data is loaded into the register bank, so that this information is available to the register bank input logic 230.

In preferred embodiments, the internal format of the data in the register bank 220 is the same as the external format, and hence single precision data values are stored as 32-bit data values, and double precision data values are stored as 64-bit data values within the register bank 220. Since the register bank input logic 230 has access to the FPREG format register 200, it knows whether the data it is receiving is single or double precision, and so, in such an embodiment, the register bank input logic 230 merely arranges the data received over path 225 for storing in the appropriate data slot(s) of the register bank 220. However, if in alternative embodiments, the internal representation within the register bank is different to the external format, then the register bank input logic 230 would be arranged to perform the necessary conversion. For example, a number is typically represented as 1.abc ... multiplied by a base value raised to the power of an exponent. For the sake of efficiency, typical single and double precision representations do not use a data bit to represent the 1 to the left of the decimal point, but rather the 1 is taken as implied. If, for any reason, the internal representation used within the register bank 220 required the 1 to be represented explicitly, then the register bank input logic 230 would perform the necessary conversion of the data. In such embodiments, the data slots would typically be somewhat bigger than 32 bits in order to accommodate the additional data generated by the register bank input logic 230.

In addition to loading data values into the register bank 220, the load store control unit 42 may also load data into one or more system registers of the coprocessor 26, for example a user status and control register FPSCR 210. In preferred embodiments, the FPSCR register 210 contains user accessible configuration bits and exception status bits, and is discussed in more detail in the architectural description of the floating point unit provided at the end of the preferred embodiment description.

If the register control and instruction issue unit 48 receives a store instruction identifying particular data slots in the register bank 220 whose contents are to be stored to memory, then the load store control unit 42 is instructed accordingly, and the necessary data words are read out from the register bank 220 to the load store control unit 42 via the register bank output logic 240. The register bank output logic 240 has access to the FPREG register 200 contents in order to determine whether the data being read out is single or double precision data. It then applies appropriate data conversion to reverse any data conversion applied by the register bank input logic 230, and provides the data to the load store control logic 42 over path 235.

In accordance with the preferred embodiments of the present invention, if the store instruction is a double precision instruction, then the coprocessor 26 can be considered to be operating in a second mode of operation where instructions are applied to double precision data values. Since double precision data values contain an even number of data words, then any store instruction issued in the second mode of operation would typically identify an even number of data slots whose contents are to be stored to memory. However, in accordance with preferred embodiments of the present invention, if an odd number of data slots are specified, then the load store control unit 42 is arranged to read the contents of FPREG register 200 and to first store those contents to memory prior to storing the identified even number of data slots from the register bank 220. Typically the data slots to be transferred are identified by a base address identifying a particular data slot in the register bank, followed by a number indicating the number of data slots (i.e. number of data words), counting from the identified data slot, that are to be stored.

Hence, if as an example, the store instruction gives as a base address the first data slot in the register bank 220, and specifies 33 data slots, this will cause the contents of all 32 data slots to be stored to memory, but, since the specified number of data slots is odd, it will also cause the contents of the FPREG register 200 to be stored to memory.

By this approach, a single instruction can be used to store both the contents of the register bank to memory, and the contents of the FPREG register 200 identifying the data types stored within the various data slots of the register bank 220. This avoids a separate instruction having to be issued to explicitly store the contents of the FPREG register 200, and hence does not so adversely affect the processing speed during a store to memory or a load from memory process.

In further embodiments of the present invention, this technique can be taken one stage further to enable additional system registers, such as the FPSCR register 210, to also be stored to memory, if required, using a single instruction. Hence, considering the example of a register bank 220 having 32 data slots, then, as discussed earlier, if 33 data slots are identified in the store instruction, then the FPREG register 200 will be stored to memory in addition to the contents of the 32 data slots in the register bank 220. However, if a different odd number exceeding the number of data slots in the register bank is identified, for example 35, then this can be interpreted by the load store control unit 42 as a requirement to also store the contents of the FPSCR register 210 to memory in addition to the contents of FPREG register 200 and the data slots of the register bank 220. The coprocessor may also include further system registers, for example exception registers identifying exceptions that have occurred during processing of instructions by the coprocessor. If a different odd number is identified in a store instruction, for example 37, then this can be interpreted by the load store control unit 42 as a requirement to additionally store the contents of the one or more exception registers in addition to the contents of the FPSCR register 210 the FPREG register 200, and the register bank 220.

This technique is particularly useful when the code initiating the store or load instruction is not aware of the register bank content, and the register bank content is only temporarily stored to memory for subsequent retrieval into the register bank. If the code were aware of the register bank content, then it may not be necessary for the contents of FPREG register 200 to also be stored to memory. Typical examples of code which may be unaware of the register bank content are context switch code and procedure call entry and exit routines.

In such cases, the contents of the FPREG register 200 can be efficiently stored to memory in addition to the contents of the register bank, and indeed, as discussed above, certain other system registers can also be stored as required.

Upon receipt of a subsequent load instruction, a similar process is employed. Hence, the load store control unit 42, upon receiving a double precision load instruction specifying an odd number of data slots, will be arranged to cause the contents of FPREG register 200 to be loaded into the FPREG register 200, followed by the contents of any system registers indicated by the number of slots identified in the load instruction, followed by an even number of data words to be stored in the specified data slots of the register bank 220. Hence, considering the earlier discussed example, if the number of data slots specified in the load instruction is 33, then the FPREG register contents will be loaded into the FPREG register 200, followed by the contents of the 32 data slots. Similarly, if the number of data slots specified in the load instruction is 35, then the contents of the FPSCR register 210 will also be loaded into the FPSCR register in addition to the above mentioned contents. Finally, if the number of data slots specified is 37, then the contents of any exception registers will also be loaded into those exception registers in addition to the above mentioned contents. Clearly, it will be appreciated by those skilled in the art that the particular actions associated with particular odd numbers is entirely arbitrary, and can be varied as desired.

Figure 14:
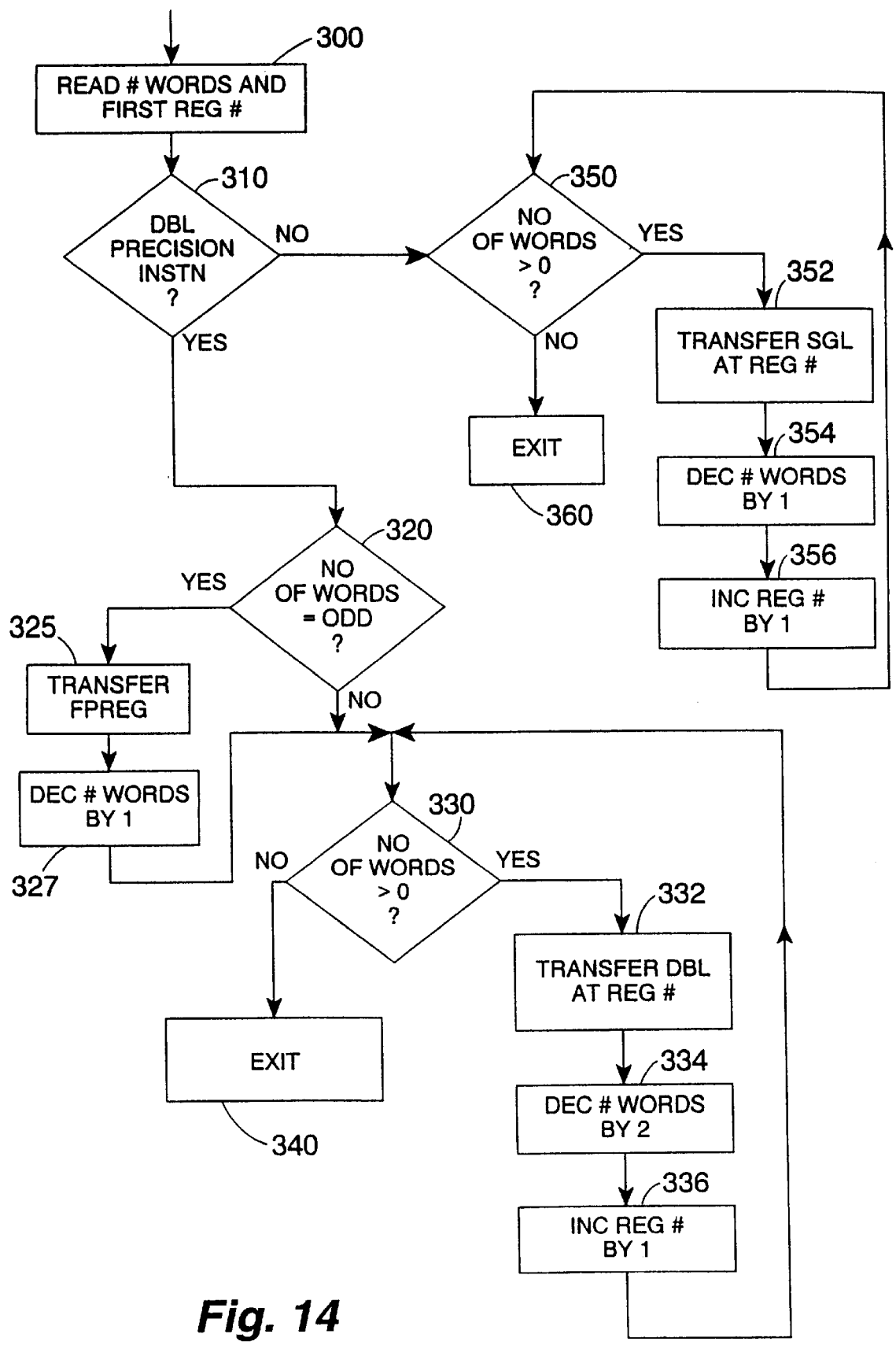
FIG. 14 is a flow diagram illustrating operation of the register control and instruction issue logic in accordance with preferred embodiments of the present invention.

FIG. 14 is a flow diagram illustrating operation of the register control and instruction issue logic 48 in accordance with preferred embodiments of the present invention when executing store and load instructions. Firstly, at step 300, the number of data words (which is identical to the number of data slots in preferred embodiments) is read from the instruction, along with the first register number, i.e. the base register, identified in the instruction. Then, at step 310, it is determined whether the instruction is a double precision instruction, as mentioned previously this information being available to the coprocessor at this stage since the instruction identifies whether it is a double precision or a single precision instruction.

If the instruction is a double precision instruction, then the process proceeds to step 320, where it is determined whether the number of words specified in the instruction is odd. Assuming for the sake of this embodiment that the technique is not used to selectively transfer various system registers in addition to the FPREG register 200, then if the number of words is odd, this will indicate that the contents of the FPREG register 200 should be transferred, and accordingly at step 325, the contents of the FPREG register are transferred by the load store control unit 42. Then, the number of words is decremented by 1 at step 327, and the process proceeds to step 330. If, at step 320, the number of words was determined to be even, then the process proceeds directly to step 330.

At step 330, it is determined whether the number of words is greater than zero. If not, then the instruction is deemed completed, and the process exits at step 340. However, if the number of words is greater than zero, then the process proceeds to step 332, where a double precision data value (i.e. the contents of two data slots) is transferred to or from the first specified register number. Then, at step 334, the number of words is decremented by 2, and at step 336, the register number is incremented by 1. As discussed earlier, for a double precision instruction, a register actually consists of two data slots, and hence incrementing the register count by one is equivalent to incrementing the data slot number by 2.

Then the procedure returns to step 330, where it is determined whether the number of words is still greater than zero, and if so the process is repeated. When the number of words reaches zero, then the process is exited at step 340.

If at step 310, it was determined that the instruction was not a double precision instruction, then the process proceeds to step 350, where it is again determined whether the number of words is greater than zero. If so, the process proceeds to step 352, where a single precision data value is transferred to or from the first register number identified in the instruction. Then, at step 354, the number of words is decremented by one, and at step 356 the register number count is incremented by one so as to point at the next data slot. Then the process returns to step 350, where it is determined whether the number of words is still greater than zero. If so, the process is repeated, until such time as the number of words is equal to zero, at which time the process is exited at step 360.

The above approach provides a great deal of flexibility when executing code which is unaware of the register bank contents, for example context switch code or procedure call entry and exit sequences. In these cases, the operating system is not aware of the contents of the registers, and it is desirable not to have to treat the registers differently, dependent on their contents. The above approach allows these code routines to be written with a single store or load instruction specifying an odd number of data words. If the coprocessor requires the use of the register content information, it will interpret the odd number of data words in the instruction as a requirement to also store to memory or load from memory the format information required to identify the contents of the data in the register bank. This flexibility removes the need for unique operating system software to support coprocessors that require the register content information.

This technique also removes the necessity for loading and storing the register content information in a separate operation within the code. Since the option to load and store the register content information is incorporated in the instruction, no additional memory access is required. This reduces the code length and potentially saves time.

An architectural description of a floating point unit incorporating the above described techniques is given below:

1. Introduction

The VFPv1 is a floating point system (FPS) architecture designed to be implemented as a coprocessor for use with ARM processor modules. Implementations of this architecture may incorporate features in either hardware or software, or an implementation may use software to complement the functionality or provide IEEE 754 compatibility. This specification intends to achieve full IEEE 754 compatibility using a combination of hardware and software support.

Two coprocessor numbers are used by VFPv1; 10 is used for operations with single precision operands, while 11 is used for operations with double precision operands. Conversion between single and double precision data is accomplished with 2 conversion instructions which operate in the source operand coprocessor space.

Features of the VFPv1 architecture include:

Full compatibility with IEEE 754 in hardware with support code.

- 32 single precision registers, each addressable as a source operand or a destination register.
- 16 double precision registers, each addressable as a source operand or a destination register. (Double precision registers overlap physical single precision registers)
- Vector mode provides for a significant increase in floating point code density and concurrency with load and store operations.
- 4 banks of 8 circulating single precision registers or 4 banks of 4 circulating double precision registers to enhance dsp and graphics operations.
- Denormal handling option selects between IEEE 754 compatibility (with intended support from the floating point emulation package) or fast flush-to-zero capability.
- Intended for implementation with a fully pipelined chained multiply-accumulate with IEEE 754 compatible results.
- Fast floating point to integer conversion for C, C++, and Java with the FFTOSIZ instruction.

Implementers may choose to implement the VFPv1 completely in hardware or utilize a combination of hardware and support code. The VFPv1 may be implemented completely in software.

2. Terminology

This specification uses the following terminology:

Automatic exception—An exceptional condition which will always bounce to the support code regardless of the value of the respective exception enable bit. The choice of which, if any, exceptions are Automatic is an implementation option. See Section 0, 6. Exception Processing Bounce—An exception reported to the operating system which will be handled by the support code entirely without calling user trap handlers or otherwise interrupting the normal flow of user code.

CDP—'Coprocessor Data Processing' For the FPS, CDP operations are arithmetic operations rather than load or store operations.

ConvertToUnsignedInteger(Fm)—Conversion of the contents in Fm to a unsigned 32-bit integer value. The result is dependent on the rounding mode for final rounding and handling of floating point values outside the range of a 32-bit unsigned integer. The INVALID exception is possible if the floating point input value is negative or too large for a 32-bit unsigned integer.

ConvertToSignedInteger(Fm)—Conversion of the contents in Fm to a signed 32-bit integer value. The result is dependent on the rounding mode for final rounding and handling of floating point values outside the range of a 32-bit signed integer. The INVALID exception is possible if the floating point input value is too large for a 32-bit signed integer.

ConvertUnsignedIntToSingle/Double(Rd)—Conversion of the contents of an ARM register (Rd), interpreted as a 32-bit unsigned integer, to a single or double precision floating point value. If the destination precision is single, an INEXACT exception is possible in the conversion operation.

ConvertSignedIntToSingle/Double(Rd)—Conversion of the contents of an ARM register (Rd), interpreted as a 32-bit signed integer, to a single or double precision floating point value. If the destination precision is single, an INEXACT exception is possible in the conversion operation.

Denormalized value—A representation of a value in the range ($-2^{Emin}<x<2^{Emin}$). In the IEEE 754 format for single and double precision operands, a denormalized value, or denormal, has a zero exponent and the leading significand bit is 0 rather than 1. The IEEE 754-1985 specification requires that the generation and manipulation of denormalized operands be performed with the same precision as with normal operands.

Disabled exception—An exception which has its associated Exception Enable bit in the FPCSR set to 0 is referred to as 'disabled.' For these exceptions the IEEE 754 specification defines the correct result to be returned. An operation which generates an exception condition may bounce to the support code to produce the IEEE 754 defined result. The exception will not be reported to the user exception handler Enabled exception—An exception with the respective exception enable bit set to 1. In the event of an occurrence of this exception a trap to the user handler will be taken. An operation which generates an exception condition may bounce to the support code to produce the IEEE 754 defined result. The exception will then be reported to the user exception handler.

Exponent—The component of a floating point number that normally signifies the integer power to which two is raised in determining the value of the represented number. Occasionally the exponent is called the signed or unbiased exponent.

Fraction—The field of the significand that lies to the right of its implied binary point.

Flush-To-Zero Mode—In this mode all values in the range ($-2^{Emin}<x<2^{Emin}$) after rounding are treated as zero, rather than converted to a denormalized value.

High(Fn/Fm)—The upper 32 bits [63:32] of a double precision value as represented in memory.

IEEE 754-1985—"IEEE Standard for Binary Floating-Point Arithmetic", ANSI/IEEE Std 754-1985, The Institute of Electrical and Electronics Engineers, Inc. New York, N.Y., 10017. The standard, often referred to as the IEEE 754 standard, which defines data types, correct operation, exception types and handling, and error bounds for floating point systems. Most processors are built in compliance with the standard in either hardware or a combination of hardware and software.

Infinity—An IEEE 754 special format used to represent ∞. The exponent will be maximum for the precision and the significand will be all zeros.

Input exception—An exception condition in which one or more of the operands for a given operation are not supported by the hardware. The operation will bounce to support code for completion of the operation.

Intermediate result—An internal format used to store the result of a calculation before rounding. This format may have a larger exponent field and significand field than the destination format.

Low(Fn/Fm)—The lower 32 bits [31:0] of a double precision value as represented in memory.

MCR—"Move to Coprocessor from ARM Register" For the FPS this includes instructions which transfer data or control registers between an ARM register and a FPS register. Only 32 bits of information may be transferred using a single MCR class instruction.

MRC—"Move to ARM Register from Coprocessor" For the FPS this includes instructions which transfer data or control registers between the FPS and an ARM register.

Only 32 bits of information may be transferred using a single MRC class instruction.

NaN—Not a number, a symbolic entity encoded in a floating point format. There are two types of NaNs, signalling and non-signalling, or quiet. Signalling NaNs will cause an Invalid Operand exception if used as an operand. Quiet NaNs propagate through almost every arithmetic operation without signalling exceptions. The format for a NaN has the exponent field of all 1's with the significand non-zero. To represent a signalling NaN the most significant bit of the fraction is zero, while a quiet NaN will have the bit set to a one.

Reserved—A field in a control register or instruction format is 'reserved' if the field is to be defined by the implementation or would produce UNPREDICTABLE results if the contents of the field were not zero. These fields are reserved for use in future extensions of the architecture or are implementation specific. All Reserved bits not used by the implementation must be written as zero and will be read as zero. Rounding Mode—The IEEE 754 specification requires all calculations to be performed as if to an infinite precision, that is, a multiply of two single precision values must calculate accurately the significand to twice the number of bits of the significand. To represent this value in the destination precision rounding of the significand is often required. The IEEE 754 standard specifies four rounding modes—round to nearest (RN), round to zero, or chop (RZ), round to plus infinity (RP), and round to minus infinity (RM). The first is accomplished by rounding at the half way point, with the tie case rounding up if it would zero the lsb of the significand, making it 'even.' The second effectively chops any bits to the right of the significand, always rounding down, and is used by the C, C++, and Java languages in integer conversions. The later two modes are used in interval arithmetic.

Significand—The component of a binary floating point number that consists of an explicit or implicit leading bit to the left of its implied binary point and a fraction field to the right.

Support Code—Software which must be used to complement the hardware to provide compatibility with the IEEE 754 standard. The support code is intended to have two components: a library of routines which perform operations beyond the scope of the hardware, such as transcendental computations, as well as supported functions, such as divide with unsupported inputs or inputs which may generate an exception; and a set of exception handlers which process exceptional conditions in order to provide IEEE 754 compliance. The support code is required to perform implemented functions in order to emulate proper handling of any unsupported data type or data representation (e.g., denormal values or decimal datatypes). The routines may be written to utilize the FPS in their intermediate calculations if care is taken to restore the users' state at the exit of the routine.

Trap—An exceptional condition which has the respective exception enable bit set in the FPSCR. The user's trap handler will be executed.

UNDEFINED—Indicates an instruction that generates an undefined instruction trap. See the ARM Architectural Reference Manual for more information on ARM exceptions.

UNPREDICTABLE—The result of an instruction or control register field value that cannot be relied upon. UNPREDICTABLE instructions or results must not represent security holes, or halt or hang the processor, or any parts of the system.

Unsupported Data—Specific data values which are not processed by the hardware but bounced to the support code for completion. These data may include infinities, NaNs, denormal values, and zeros. An implementation is free to select which of these values will be supported in hardware fully or partially, or will require assistance from support code to complete the operation. Any exception resulting from processing unsupported data will be trapped to user code if the corresponding exception enable bit for the exception is set.

3. Register File 3.1 Introductory Notes

The architecture provides 32 single precision and 16 double precision registers, all individually addressable within a fully defined 5-bit register index as source or destination operands.

The 32 single precision registers are overlapped with the 16 double precision registers, i.e., a write of a double precision data to D5 will overwrite the contents of S10 and S11. It is the job of the compiler or the assembly language programmer to be aware of register usage conflicts between the use of a register as a single precision data storage and as half of a double precision data storage in an overlapped implementation. No hardware is provided to insure register use is limited to one precision, and the result is UNPREDICTABLE if this is violated.

VFPv1 provides access to these registers in a scalar mode, in which one, two, or three operand registers are used to produce a result which is written into a destination register, or in vector mode, in which the operands specified refer to a group of registers. VFPv1 supports vector operations for up to eight elements in a single instruction for single precision operands and up to 4 elements for double precision operands.

TABLE 1

LEN Bit Encodings

| LEN | Vector Length Encoding |
|---|---|
| 000 | Scalar |
| 001 | Vector length 2 |
| 010 | Vector length 3 |
| 011 | Vector length 4 |
| 100 | Vector length 5 |
| 101 | Vector length 6 |
| 110 | Vector length 7 |
| 111 | Vector length 8 |

Vector mode is enabled by writing a non-zero value to the LEN field. If the LEN field contains 0, the FPS operates in scalar mode, and the register fields are interpreted as addressing 32 individual single precision registers or 16 double precision registers in a flat register model. If the LEN field is non-zero, the FPS operates in vector mode, and the register fields are as addressing vectors of registers. See Table 1 for encoding of the LEN field.

A means of mixing scalar and vector operations without changing the LEN field is available through the specification of the destination register. Scalar operations may be specified while in vector mode if the destination register is in the first bank of registers (S0–S7 or D0–D3). See Section 0 for more information.

3.2 Single Precision Register Usage

If the LEN field in the FPSCR is 0, 32 single precision registers are available numbered S0 through S31. Any of the registers may be used as a source or destination register.

Illustration 1. Single Precision Register Map

| 31 | 31 | 31 | 31 0 |
|----|----|----|------|
| S0 | S8 | S16 | S24 |
| S1 | S9 | S17 | S25 |
| S2 | S10 | S18 | S26 |
| S3 | S11 | S19 | S27 |
| S4 | S12 | S20 | S28 |
| S5 | S13 | S21 | S29 |
| S6 | S14 | S22 | S30 |
| S7 | S15 | S23 | S31 |

The single precision (coprocessor 10) register map may be drawn as shown in Illustration 1.

If the LEN field in the FPSCR is greater than 0, the register file behaves as 4 banks of 8 circulating registers, as shown in Illustration 2. The first bank of vector registers, V0 through V7, overlap with scalar registers S0 through S7, and are addressed as scalars or vectors according to the registers selected for each operand. See Section 0, 3.4 Register Usage, for more information.

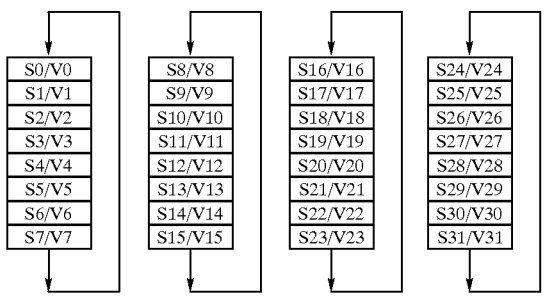

Illustration 2. Circulating Single Precision Registers

For example, if the LEN in the FPSCR is set to 3, referencing vector V10 will cause registers S10, S11, S12, and S13 to be involved in a vector operation. Similarly, V22 would involve S22, S23, S16, and S17 in the operation. When the register file is accessed in vector mode, the register following V7 in order is V0; similarly, V8 follows V15, V16 follows V23, and V24 follows V31.

3.3 Double Precision Register Usage

If the LEN field in the FPSCR is 0, 16 double precision scalar registers are available.

Illustration 3. Double Precision Register Map

| 63 0 | 63 0 |
|------|------|
| D0 | D8 |
| D1 | D9 |
| D2 | D10 |
| D3 | D11 |
| D4 | D12 |
| D5 | D13 |
| D6 | D14 |
| D7 | D15 |

Any of the registers may be used as a source or destination register. The register map may be drawn as shown in Illustration 3.

If the LEN field in the FPSCR is greater than 0, 4 scalar registers and 16 vector registers, in 4 banks of 4 circulating registers, are available as shown in Illustration 4. The first bank of vector registers, V0 through V3, overlap with scalar registers D0 through D3. The registers are addressed as scalars or according to the registers selected for each operand. See Section 0, 3.4 Register Usage, for more information.

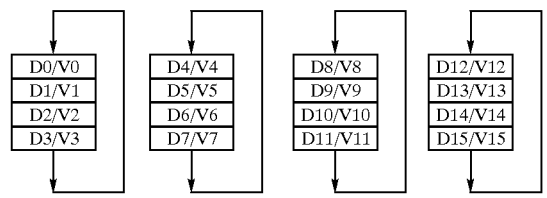

Illustration 4. Circulating Double Precision Registers

As with the single precision examples in Section 0, the double precision registers are circulating within the four banks.

3.4 Register Usage

Three operations between scalars and vectors are supported: ($OP_2$ may be any of the two operand operations supported by the floating point coprocessor; $OP_3$ may be any of the three operand operations.)

For the following descriptions, the 'first bank' of the register file is defined as registers S0–S7 for single precision operations and D0–D3 for double precision operations.

ScalarD=$OP_2$ ScalarA or ScalarD=ScalarA $OP_3$ ScalarB or ScalarD=ScalarA * ScalarB+ScalarD VectorD=$OP_2$ ScalarA or VectorD=ScalarA $OP_3$ VectorB or VectorD=ScalarA * VectorB+VectorD VectorD=$OP_2$ VectorA or VectorD=VectorA $OP_3$ VectorB or VectorD=VectorA * VectorB+VectorD 3.4.1 Scalar Operations Two conditions will cause the FPS to operate in scalar mode:

1 The LEN field in the FPSCR is 0. Destination and source registers may be any of the scalar registers, 0 through 31 for single precision operations and 0 through 15 for double precision operations. The operation will be performed only on the registers explicitly specified in the instruction.

2 The destination register is in the first bank of the register file. The source scalars may be any of the other registers. This mode allows the intermixing of scalar and vector operations without having to change the LEN field in the FPSCR.

3.4.2 Operations Involving a Scalar and Vector Source with a Vector Destination

To operate in this mode, the LEN field in the FPSCR is greater than zero, and the destination register is not in the first bank of the register file. The scalar source registers may be any register in the first bank of the register file while any of the remaining registers may be used for VectorB. Note that the behavior is UNPREDICTABLE if the source scalar register is a member of VectorB or if VectorD overlaps VectorB in less then LEN elements. I.e., Vector D and VectorB must be either the same vector or completely distinct in all members. See the summary tables in Section 0.

3.4.3 Operations Involving Only Vector Data

To operate in this mode, the LEN field in the FPSCR is greater than zero and the destination vector register is not in the first bank of the register file. The individual elements of the VectorA vector are combined with the corresponding element in VectorB and written to VectorD. Any register not in the first bank of the register file is available for Vector A, while all vectors are available for VectorB. As in the second case, the behavior is UNPREDICTABLE if the either of the source vectors and the destination vector overlap in less than LEN elements. They must be identical or completely distinct in all members. See the summary tables in Section 0.

Note that for the FMAC family of operations the destination register or vector is always the accumulate register or vector.

3.4.4 Operation Summary Tables

The following tables present the register usage options for single and double precision 2 and 3 operand instructions. 'Any' refers to availability of all registers in the precision for the specified operand.

TABLE 2

Single Precision 3-Operand Register Usage

| LEN field | Destination Reg | First Source Reg | Second Source Reg | Operation Type |
|---|---|---|---|---|
| 0 | Any | Any | Any | S = S op S or S = S * S + S |
| non-0 | 0–7 | Any | Any | S = S op S or S = S * S + S |
| non-0 | 8–31 | 0–7 | Any | V = S op V or V = S * V + V |
| non-0 | 8–31 | 8–31 | Any | V = V op V or V = V * V + V |

TABLE 3

Single Precision 2-Operand Register Usage

| LEN field | Destination Reg | Source Reg | Operation Type |
|---|---|---|---|
| 0 | Any | Any | S = op S |
| non-0 | 0–7 | Any | S = op S |
| non-0 | 8–31 | 0–7 | V = op S |
| non-0 | 8–31 | 8–31 | V = op V |

TABLE 4

Double Precision 3-Operand Register Usage

| LEN field | Destination Reg | First Source Reg | Second Source Reg | Operation Type |
|---|---|---|---|---|
| 0 | Any | Any | Any | S = S op S or S = S * S + S |
| non-0 | 0–3 | Any | Any | S = S op S or S = S * S + S |
| non-0 | 4–15 | 0–3 | Any | V = S op V or V = S * V + V |
| non-0 | 4–15 | 4–15 | Any | V = V op V or V = V * V + V |

TABLE 5

Double Precision 2-Operand Register Usage

| LEN field | Destination Reg | Source Reg | Operation Type |
|---|---|---|---|
| 0 | Any | Any | S = op S |
| non-0 | 0–3 | Any | S = op S |
| non-0 | 4–15 | 0–3 | V = op S |
| non-0 | 4–15 | 4–15 | V = op V |

4. Instruction Set

FPS instructions may be divided into three categories:

MCR and MRC—Transfer operations between the ARM and the FPS

LDC and STC—Load and store operations between the FPS and memory

CDP—Data processing operations

4.1 Instruction Concurrency

The intent of the FPS architectural specification is concurrency on two levels: pipelined functional units and parallel load/store operation with CDP functions. A significant performance gain is available by supporting load and store operations which do not have register dependencies with currently processing operations to execute in parallel with these operations.

4.2 Instruction Serialization

The FPS specifies a single instruction that causes the FPS to busy-wait the ARM until all currently executing instructions have completed and the exception status of each is known. If an exception is pending, the serializing instruction will be aborted and exception processing will begin in the ARM. The serializing instructions in the FPS is:

FMOVX—read or write to a floating point system register

Any read or write to a floating point system register will be stalled until the current instructions have completed. An FMOVX to the System ID Register (FPSID) will trigger an exception caused by the preceding floating point instruction. Performing a read/modify/write (using FMOVX) on the User Status and Control Register (FPSCR) can be used to clear the exception status bits (FPSCR[4:0]).

4.3 Conversion involving Integer Data

The conversion between floating point and integer data is a two step process in the FPS made up of a data transfer instruction involving the integer data and a CDP instruction performing the conversion. If any arithmetic operation is attempted on the integer data in the FPS register while in integer format the results are UNPREDICTABLE and any such operation should be avoided.

4.3.1 Conversion of Integer Data to Floating Point Data in a FPS Register

Integer data may be loaded into a floating point single precision register from either an ARM register, using a MCR FMOVS instruction. The integer data in the FPS register may then be converted into a single or double precision floating point value with the integer-to-float family of operations and written to a destination FPS register. The destination register may be the source register if the integer value is no longer needed. The integer may be a signed or unsigned 32-bit quantity.

4.3.2 Conversion of Floating Point Data in an FPS Register to Integer Data

A value in a FPS single or double precision register may be converted to signed or unsigned 32-bit integer format with the float-to-integer family of instructions. The resulting integer is placed in the destination single precision register. The integer data may be stored to an ARM register using the MRC FMOVS instruction.

4.4 Register File Addressing

Instructions operating in single precision space (S=0) will use the 5 bits available in the instruction field for operand access. The upper 4 bits are contained in the operand fields labeled Fn, Fm, or Fd; the least significant bit of the address is in N, M, or D, respectively.

Instructions operating in double precision space (S=1) will use only the upper 4 bits of the operand address. These 4 bits are contained in the Fn, Fm, and Fd fields. The N, M, and D bits must contain 0 when the corresponding operand field contains an operand address.

4.5 MCR (Move to Coprocessor from ARM Register)

The MCR operations involve the transfer or use of data in ARM registers by the FPS. This includes moving data in single precision format from an ARM register or in double precision format from a pair of ARM registers to an FPS register, loading a signed or unsigned integer value from an ARM register to a single precision FPS register, and loading a control register with the contents of an ARM register.

The format for an MCR instruction is given in Illustration 5.

Illustration 5
MCR Instruction Format

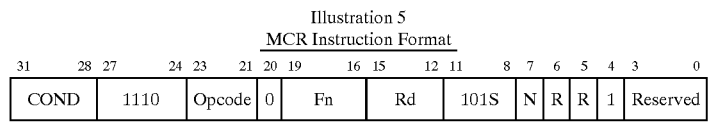

TABLE 6

MCR Bit Field Definitions

| Bit Field | Definition |
|---|---|
| Opcode | 3-bit operation code (See Table 7) |
| Rd | ARM Source register encoding |
| S | Operation operand size. |
|   | 0 - Single precision operands |
|   | 1 - Double precision operands |
| N | Single precision operations: |
|   | Destination register lsb |
|   | Double precision operations: |
|   | Must be set to 0 or the operation is UNDEFINED |
|   | System register moves |
|   | Reserved |
| Fn | Single precision operations: |
|   | Destination register address upper 4 bits |
|   | Double precision operations: |
|   | Destination register address |
|   | System register moves: |
|   | 0000 - FPID (Coprocessor ID number) |
|   | 0001 - FPSCR (User Status and Control Register) |
|   | 0100 - FPREG (Register File Content Register) |
|   | Other register encodings are Reserved and may be |
|   | different on various implementations. |
| R | Reserved bits |

TABLE 7

MCR Opcode Field Definition

| Opcode Field | Name | Operation |
|---|---|---|
| 000 | FMOVS | Fn = Rd (32 bits, coprocessor 10) |
| 000 | FMOVLD | Low(Fn) = Rd (Double precision low 32 bits, coprocessor 11) |
| 001 | FMOVHD | High(Fn) = Rd (Double precision high 32 bits, coprocessor 11) |
| 010–110 | Reserved | |
| 111 | FMOVX | System Reg = Rd (coprocessor 10 space) |

Note: Only 32-bit data operations are supported by FMOV [S, HD, LD] instructions. Only the data in the ARM register or single precision register is moved by the FMOVS operation. To transfer a double precision operand from 2 ARM registers the FMOVLD and FMOVHD instructions will move the lower half and the upper half, respectively.

4.6 MRC (Move to ARM Register from Coprocessor/Compare Floating Registers)

The MRC operations involve the transfer of data in an FPS register to an ARM register. This includes moving a single precision value or the result of a conversion of a floating point value to integer to an ARM register or a double precision FPS register to two ARM registers, and modifying the status bits of the CPSR with the results of a previous floating point compare operation.

The format of the MRC instruction is shown in Illustration 6.

Illustration 6
MCR Instruction Format

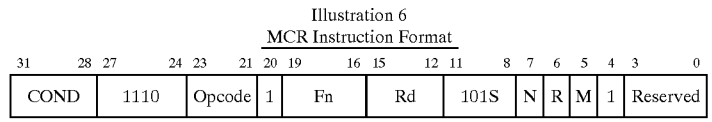

TABLE 8

MRC Bit Field Definitions

| Bit Field | Definition |
|---|---|
| Opcode | 3-bit FPS operation code (See Table 9) |
| Rd | ARM destination* register encoding |
| S | Operation operand size. |
|  | 0 - Single precision operands |
|  | 1 - Double precision operands |
| N | Single precision operations: |
|  | Destination register lsb |
|  | Double precision operations: |
|  | Must be set to 0 or operation is UNDEFINED |
|  | System register moves |
|  | Reserved |
| M | Reserved |
| Fn | Single precision operations: |
|  | Destination register address upper 4 bits |
|  | Double precision operations: |
|  | Destination register address |
|  | System register moves: |
|  | 0000 - FPID (Coprocessor ID number) |
|  | 0001 - FPSCR (User Status and Control Register) |
|  | 0100 - FPREG (Register File Content Register) |
|  | Other register encodings are Reserved and may be different on various implementations. |
| Fm | Reserved |
| R | Reserved |

*For the FMOVX FPSCR instruction, if the Rd field contains R15 (1111), the upper 4 bits of the CPSR will be updated with the resulting condition codes.

TABLE 9-continued

MRC Opcode Field Definition

| Opcode Field | Name | Operation |
|---|---|---|
| 010– 110 | Reserved | |
| 111 | FMOVX | Rd = System Reg |

Note: See the Note for MCR FMOV instruction.

4.7 LDC/STC (Load/Store FPS Registers)

LDC and STC operations transfer data between the FPS and memory. Floating point data may be transferred in either precision in a single data transfer or in multiple data transfers, with the ARM address register updated or left unaffected. Both full descending stack and empty ascending stack structures are supported, as well as multiple operand access to data structures in the move multiple operations. See Table 11 for a description of the various options for LDC and STC.

The format of the LDC and STC instructions is shown in Illustration 7.

Illustration 7
LDC/STC Instruction Format

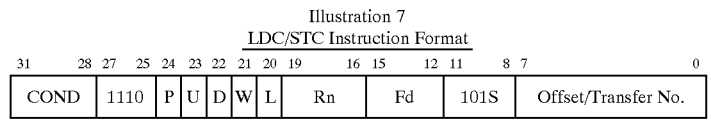

TABLE 9

MRC Opcode Field Definition

| Opcode Field | Name | Operation |
|---|---|---|
| 000 | FMOVS | Rd = Fn (32 bits, coprocessor 10) |
| 000 | FMOVLD | Rd = Low(Fn) Lower 32 bits of Dn are transferred. (Double precision low 32 bits, coprocessor 11) |
| 001 | FMOVHD | Rd = High(Fn) Upper 32 bits of Dn are transferred. (Double precision high 32 bits, coprocessor 11) |

TABLE 10

LDC/STC Bit Field Definitions

| Bit Field | Definition |
|---|---|
| P | Pre/Post Indexing (0=post, 1=pre) |
| U | Up/Down bit (0=down,1=up) |
| D | Single precision operations: |
|  | Source/Destination register lsb |
|  | Double precision operations: |
|  | Must be set to 0 |
| W | Write-back bit (0=no writeback, 1=writeback) |
| L | Direction bit (0=store, 1=load) |
| Rn | ARM Base register encoding |
| Fd | Single precision operations: |

TABLE 10-continued

LDC/STC Bit Field Definitions

| Bit Field | Definition |
| --- | --- |
| | Source/Destination register address upper 4 bits<br>Double precision operations:<br>Source/Destination register address |
| S | Operation operand size.<br>0 - Single precision operands<br>1 - Double precision operands |
| Offset/<br>Transfer<br>No. | Unsigned 8-bit offset or number of single precision (double the count of double precision registers) registers to transfer for FLDM(IA/DB) and FSTM(IA/DB). The maximum number of words in a transfer is 16, allowing for 16 single precision values or 8 double precision values. |

4.7.1 General Notes for Load and Store Operations

Loading and storing multiple registers will do so linearly through the register file without wrapping across 4 or 8 register boundaries used by the vector operations. Attempting to load past the end of the register file is UNPREDICTABLE.

If the offset for a double load or store multiple contains an odd register count 17 or less, the implementation may write another 32-bit data item or read another 32-bit data item, but is not required to do so. This additional data item may be used to identify the contents of the registers as they are loaded or stored. This is useful in implementations in which the register file format is different from the IEEE 754 format for the precision and each register has type information which is required to identify it in memory. If the offset is odd and the number is greater than the number of single precision registers, this may be used to initiate a context switch of the registers and all the system registers.

TABLE 11

Load and Store Addressing Mode Options

| P | W | Offset/<br>Transfer<br>No. | Addressing<br>Mode | Name |
| --- | --- | --- | --- | --- |
| Type 0 Transfer: Load/Store multiple with no writeback | | | | |
| 0 | 0 | Number of registers to transfer | FLDM<cond><S/D> Rn, <register list><br>FSTM<cond><S/D> Rn, <register list> | Load/ Store Multiple |

Load/store multiple registers from a starting address in Rn and no modification of Rn. The number of registers may be 1 to 16 for single precision, 1 to 8 for double precision. The offset field contains the number of 32-bit transfers. This mode may be used to load a transform matrix for graphics operations and a point for the transform.
Examples:
FLDMEQS r12, {f8–f11}     ; loads 4 single from the address in r12 to 4 fp registers s8, s9, s10, and r12 is unchanged
FSTMEQD r4, {f0}          ; stores one double from d0 to the address in r4. r4 is unchanged.

| Type 1 Transfer: Load/Store multiple with post-index of Rn and writeback | | | | |
| --- | --- | --- | --- | --- |
| 0 | 1 | Number of registers to transfer | FLDM<cond>IA<S/D> Rn!, <register list><br>FSTM<cond>IA<S/D> Rn!, <register list> | Load/Store Multiple |

Load/Store multiple registers from a starting address in Rn and writeback of the next address after the last transfer to Rn. The offset field is the number of 32-bit transfers. The writeback to Rn is Offset*4. The maximum number of words transferred in a load multiple is 16. The U bit must be set to 1. This is used for storing into an empty ascending stack or loading from a full descending stack, or storing a transformed point and incrementing the pointer to the next point, and for loading and storing multiple data in a filter operation.
Example:
FLDMEQIAS r13!, {f12–f15}   ; loads 4 singles from the address in r13 to 4 fp registers s12,s13,s14, and s15, updating r13 with the address pointing to the next data the series.

| Type 2 Transfer: Load/Store one register with pre-index or Rn and no writeback | | | | |
| --- | --- | --- | --- | --- |
| 1 | 0 | Offset | FLD<cond><S/D> [Rn, #+/−offset], Fd<br>FST<cond><S/D> [Rn, #+/−offset], Fd | Load/Store with Offset |

Load/Store single register with pre-increment of the address in Rn and no writeback. The offset value is Offset*4, and is added (U=1) or subtracted (U=0) from Rn to generate the address. This is useful for operand access into a structure and is the typical method used to access memory for floating point data.
Example:
FSTEQD f4, [r8, #+8]       ; Stores a double to d4 from the address in r8 offset by 32 (8 * 4) bytes. r8 is unchanged.
Type 3 Transfer: Load/Store multiple registers with pre-index and writeback

TABLE 11-continued

Load and Store Addressing Mode Options

| P | W | Offset/ Transfer No. | Addressing Mode | Name |
|---|---|---|---|---|
| 1 | 1 | Number of registers to transfer | FLDM<cond>DB<S/D> Rn!, <register list><br>FSTM<cond>DB<S/D> Rn!, <register list> | Load/Store Multiple with Pre-Decrement |

Load/Store multiple registers with pre-decrement of the address in Rn and writeback of the new target address to Rn. The offset field contains the number of 32-bit transfers. The writeback value is the Offset*4, subtracted (U=0) from Rn. This mode is used for storing to a full descending stack or loading from an empty ascending stack.
Example:
FSTMEQDBS r9!,{f27–f29}    ; store 3 singles from s27, s28, and s29 to a full descending stack with the last entry address contained in r9. r9 is updated to point to the new last entry.

4.7.2 LDC/STC Operation Summary

Table 12 lists the allowable combinations for the P, W, and U bits in the LDC/STC opcode and the function of the offset field for each valid operation.

TABLE 12

LDC/STC Operation Summary

| P | W | U | Offset Field | Operation |
|---|---|---|---|---|
| 0 | 0 | 0 | | UNDEFINED |
| 0 | 0 | 1 | Reg Count | FLDM/FSTM |
| 0 | 1 | 0 | | UNDEFINED |
| 0 | 1 | 1 | Reg Count | FLDMIA/FSTMIA |
| 1 | 0 | 0 | Offset | FLD/FST |
| 1 | 0 | 1 | Offset | FLD/FST |
| 1 | 1 | 0 | Reg Count | FLDMDB/FSTMDB |
| 1 | 1 | 1 | | UNDEFINED |

4.8 CDP (Coprocessor Data Processing)

CDP instructions include all data processing operations which involve operands from the floating point register file and produce a result which will be written back to the register file. Of special interest is the FMAC (multiply-accumulate chained) operation, an operation performing a multiply on two of the operands and adding a third. This operation differs from fused multiply-accumulate operations in that an IEEE rounding operation is performed on the product before the addition of the third operand. This allows Java code to utilize the FMAC operation to speed up multiply-accumulate operations over the separate multiply then add operations.

Two instructions in the CDP group are useful in conversion of a floating point value in a FPS register to its integer value. FFTOUI[S/D] performs a conversion of the contents of a single or double precision to an unsigned integer in a FPS register, using the current rounding mode in the FPSCR. FFTOSI[S/D] performs the conversion to a signed integer. FFTOUIZ[S/D] and FFTOSIZ[S/D] perform the same functions but override the FPSCR rounding mode for the conversion and truncates any fraction bits. The functionality of FFTOSIZ[S/D] is required by C, C++, and Java in float to integer conversions. The FFTOSIZ[S/D] instructions provide this capability without requiring adjustment of the rounding mode bits in the FPSCR to RZ for the conversion, reducing the cycle count for the conversion to only that of the FFTOSIZ[S/D] operation, saving 4 to 6 cycles.

Compare operations are performed using the CDP CMP instructions followed by a MRC FMOVX FPSCR instruction to load the ARM CPSR flag bits with the resulting FPS flag bits (FPSCR[31:28]). The compare operations are provided with and without the potential for an INVALID exception if one of the compare operands is a NaN. The FCMP and FCMP0 will not signal the INVALID if one of the compare operands is a NaN, while the FCMPE and FCMPE0 will signal the exception. The FCMP0 and FCMPE0 compare the operand in the Fm field with 0 and set the FPS flags accordingly. The ARM flags N, Z, C, and V are defined as follows after a FMOVX FPSCR operation:

N Less than
Z Equal
C Greater Than or Equal or Unordered
V Unordered

The format of the CDP instruction is shown in Illustration 8.

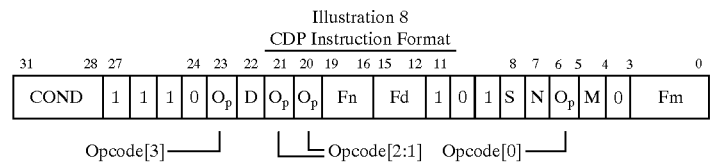

Illustration 8
CDP Instruction Format

TABLE 13

CDP Bit Field Definitions

| Bit Field | Definition |
|---|---|
| Opcode | 4-bit FPS operation code (See Table 14) |
| D | Single precision operations:<br>Destination register lsb<br>Double precision operations:<br>Must be set to 0 |
| Fn | Single precision operations:<br>Source A register upper 4 bits OR<br>Extend opcode most significant 4 bits<br>Double precision operations:<br>Source A register address OR<br>Extend opcode most significant 4 bits |
| Fd | Single precision operations:<br>Destination register upper 4 bits<br>Double precision operations:<br>Destination register address |
| S | Operation operand size.<br>0 - Single precision operands<br>1 - Double precision operands |
| N | Single precision operations:<br>Source A register lsb<br>Extend opcode lsb<br>Double precision operations:<br>Must be set to 0<br>Extend opcode lsb |
| M | Single precision operations:<br>Source B register lsb<br>Double precision operations:<br>Must be set to 0 |
| Fm | Single precision operations:<br>Source B register address upper 4 bits<br>Double precision operations:<br>Source B register address |

4.8.1 Opcodes

Table 14 lists the primary opcodes for the CDP instructions. All mnemonics have the form [OPERATION][COND][S/D].

TABLE 14

CDP Opcode Specification

| Opcode Field | Operation Name | Operation |
|---|---|---|
| 0000 | FMAC | Fd = Fn * Fm + Fd |
| 0001 | FNMAC | Fd = −(Fn * Fm + Fd) |
| 0010 | FMSC | Fd = Fn * Fm − Fd |
| 0011 | FNMSC | Fd = −(Fn * Fm − Fd) |
| 0100 | FMUL | Fd = Fn * Fm |
| 0101 | FNMUL | Fd = −(Fn * Fm) |
| 0110 | FSUB | Fd = Fn − Fm |
| 0111 | FNSUB | Fd = −(Fn − Fm) |
| 1000 | FADD | Fd = Fn + Fm |
| 1001–1011 | Reserved | |
| 1100 | FDIV | Fd = Fn / Fm |
| 1101 | FRDIV | Fd = Fm / Fn |
| 1110 | FRMD | Fd = Fn % Fm (Fd = fraction left after Fn / Fm) |
| 1111 | Extend | Use Fn register field to specify operation for 2 operand operations (See Table 15) |

4.8.2 Extended Operations

Table 15 lists the extended operations available using the Extend value in the opcode field. All instructions have the form [OPERATION][COND][S/D] with the exception of the serializing and FLSCB instructions. The instruction encoding for the Extended operations is formed in the same way as the index into the register file for the Fn operand, i.e., {Fn[3:0], N}.

TABLE 15

CDP Extended Operations

| Fn \| N | Name | Operation |
|---|---|---|
| 00000 | FCPY | Fd = Fm |
| 00001 | FABS | Fd = abs(Fm) |
| 00010 | FNEG | Fd = −(Fm) |
| 00011 | FSQRT | Fd = sqrt(Fm) |
| 00100–00111 | Reserved | |
| 01000 | FCMP* | Flags := Fd ⇔ Fm |
| 01001 | FCMPE* | Flags := Fd ⇔ Fm with exception reporting |
| 01010 | FCMP0* | Flags := Fd ⇔ 0 |
| 01011 | FCMPE0* | Flags := Fd ⇔ 0 with exception reporting |
| 01100–01110 | Reserved | |
| 01111 | FCVTD<cond>S* | Fd(double reg encoding) = Fm(single reg encoding) converted single to double precision. (coprocessor 10) |
| 01111 | FCVTS<cond>D* | Fd(single reg encoding) = Fm(double reg encoding) converted double to single precision. (coprocessor 11) |
| 10000 | FUITO* | Fd = ConvertUnsignedIntToSingle/Double(Fm) |
| 10001 | FSITO* | Fd = ConvertSignedIntToSingle/Double(Fm) |
| 10010–10111 | Reserved | |
| 11000 | FFTOUI* | Fd = ConvertToUnsignedInteger(Fm) {CurrentRMODE} |
| 11001 | FFTOUIZ* | Fd = ConvertToUnsignedInteger(Fm) {RZ mode} |
| 11010 | FFTOSI* | Fd = ConvertToSignedInteger(Fm) {Current RMODB} |
| 11011 | FFTOSIZ* | Fd = ConvertToSignedInteger(Fm) {RZ mode} |
| 11100–11111 | Reserved | |

Non-vectorizable operations. The LEN field is ignored and a scalar operation is performed on the specified registers.

5. System Registers

5.1 System ID Register (FPSID)

The FPSID contains the FPS architecture and implementation-defined identification Illustration 9
FPSID Register Encoding

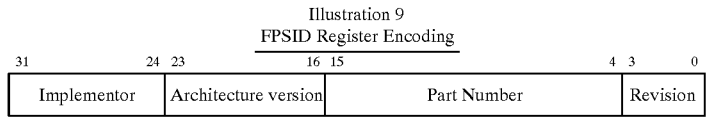

value. This word may be used to determine the model, feature set and revision of the FPS and the mask set number. The FPSID is read only and writes to the FPSID are ignored. See Illustration 9 for the FPSID register layout.

5.2 User Status and Control Register (FPSCR)

The FPSCR register contains user accessible configuration bits and the exception status bits. The configuration options include the exception enable bits, rounding control, vector stride and length, handling of denormal operands and results, and the use of debug mode. This register is for user and operating system code to configure Illustration 10
User Status and Control Register

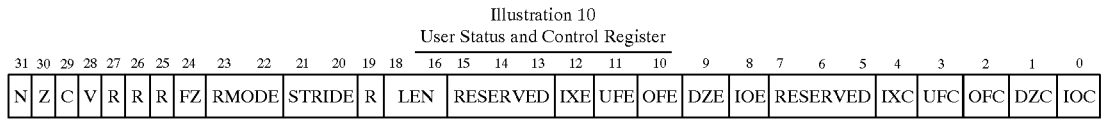

the FPS an interrogate the status of completed operations. It must be saved and restored during a context switch. Bits 31 through 28 contain the flag values from the most recent compare instruction, and may be accessed using a read of the FPSCR. The FPSCR is shown in Illustration 10.

5.2.1 Compare Status and Processing Control Byte

Bits 31 through 28 contain the result of the most recent compare operation and several control bits useful in specifying the arithmetic response of the FPS in special circumstances. The format of the Compare Status and Processing Control Byte are given in Illustration 11.

Illustration 11
FPSCR Compare Status and Processing
Control Byte

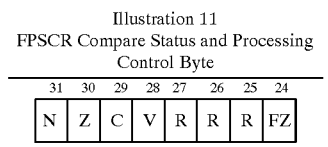

TABLE 16

FPSCR Compare Status and Processing Control Byte Field Definitions

| Register Bit | Name | Function |
|---|---|---|
| 31 | N | Compare result was less than |
| 30 | Z | Compare result was equal |
| 29 | C | Compare result was greater than or equal or unordered |
| 28 | V | Compare result was unordered |
| 27:25 | Reserved | |
| 24 | FZ | Flush to zero<br>0 : IEEE 754 Underflow handling (Default)<br>1 : Flush tiny results to zero<br>Any result which is smaller than the normal range for the destination precision will result |

TABLE 16-continued

FPSCR Compare Status and Processing Control Byte Field Definitions

| Register Bit | Name | Function |
|---|---|---|
| | | in a zero Written to the destination. The UNDERFLOW exception trap will not be taken. |

5.2.2 System Control Byte

The system control byte controls the rounding mode, vector stride and vector length fields. The bits are specified as shown in Illustration 12.

The VFPv1 architecture incorporates a register file striding mechanism for use with vector operations. If the STRIDE bits are set to 00, the next register selected in a vector operation will be the register immediately following the previous register in the register file. The normal register file wrapping mechanism is unaffected by the stride value. A STRIDE of 11 will increment all input registers and the output register by 2. For example,

FMULEQS F8, F16, F24 will perform the following non-vector operations:

FMULEQS F8, F16, F24
FMULEQS F10, F18, F26
FMULEQS F12, F20, F28
FMULEQS F14, F22, F30 effectively 'striding' the operands for the multiply in the register file by 2 rather than by 1 register

| Illustration 12. FPSCR System Control Byte | | | |
|---|---|---|---|
| 23 22 | 21 20 | 19 | 18 16 |
| RMODE | STRIDE | R | LEN |

TABLE 17

FPSCR System Control Byte Field Definitions

| Register Bit | Name | Function |
| --- | --- | --- |
| 23:22 | RMODE | Set rounding mode<br>00 : RN (Round to Nearest, Default)<br>01 : RP (Round towards Plus Infinity)<br>10 : RM (Round towards Minus Infinity)<br>11 : RZ (Round towards Zero) |
| 21:20 | STRIDE | Set the vector register access to:<br>00 : 1 (Default)<br>01 : RESERVED<br>10 : RESERVED<br>11 : 2 |
| 19 | Reserved (R) | |
| 18:16 | LEN | Vector Length. Specifies length for vector operations. (Not all encodings are available in each implementation.)<br>000 : 1 (Default)<br>001 : 2<br>010 : 3<br>011 : 4<br>100 : 5<br>101 : 6<br>110 : 7<br>111 : 8 |

5.2.3 Exception Enable Byte

The exception enable byte occupies bits 15:8 and contains the enables for exception traps. The bits are specified as shown in Illustration 13. The exception enable bits conform to the requirements of the IEEE 754 specification for handling of floating point exception conditions. If the bit is set, the exception is enabled, and FPS will signal a user visible trap to the operating system in the event of an occurrence of the exceptional condition on the current instruction. If the bit is cleared, the exception is not enabled, and the FPS will not signal a user visible trap to the operating system in the event of the exceptional condition, but will generate a mathematically reasonable result. The default for the exception enable bits is disabled. For more information on exception handling please see the IEEE 754 standard.

Some implementations will generate a bounce to the support code to handle exceptional conditions outside the capability of the hardware, even when the exception is disabled. This will be generally invisible to user code.

Illustration 13. FPSCR Exception Enable

| 15 13 | 12 | 11 | 10 | 9 | 8 |
| --- | --- | --- | --- | --- | --- |
| Reserved | IXE | UFE | OFE | DZE | IOE |

TABLE 18

FPSCR Exception Enable Byte Fields

| Register Bit | Name | Function |
| --- | --- | --- |
| 15:13 | Reserved | |
| 12 | IXE | Inexact Enable Bit<br>0: Disabled (Default)<br>1: Enabled |
| 11 | UFE | Underflow Enable Bit<br>0: Disabled (Default)<br>1: Enabled |
| 10 | OFE | Overflow Enable Bit<br>0: Disabled (Default)<br>1: Enabled |
| 9 | DZE | Divide-by-Zero Enable Bit<br>0: Disabled (Default)<br>1: Enabled |
| 8 | IOE | Invalid Operand Enable Bit<br>0: Disabled (Default)<br>1: Enabled |

5.2.4 Exception Status Byte

The exception status byte occupies bits 7:0 of the FPSCR and contains the exception status flag bits. There are five exception status flag bits, one for each floating point exception. These bits are 'sticky'; once set by a detected exception, they must be cleared by a FMOVX write to the FPSCR or a FSERIALCL instruction. The bits are specified as shown in Illustration 14. In the case of an enabled exception, the corresponding exception status bit will not be automatically set. It is the task of the support code to set the proper exception status bit as needed. Some exceptions may be automatic, i.e., if the exception condition is detected, the FPS will bounce on the subsequent floating point instruction regardless of how the exception enable bit is set. This allows some of the more involved exception processing required by the IEEE 754 standard to be performed in software rather than in hardware. An example would be an underflow condition with the FZ bit set to 0. In this case, the correct result may be a denormalized number depending on the exponent of the result and the rounding mode. The FPS allows implementers to select the response including the option to bounce and utilize the support code to produce the correct result and write this value to the destination register. If the underflow exception enable bit is set, the user's trap be called after the support code has completed the operation. This code state of the FPS and return, or terminate the process.

Illustration 14. FPSCR Exception Status Byte

| 7 5 | 4 | 3 | 2 | 1 | 0 |
| --- | --- | --- | --- | --- | --- |
| Reserved | IXC | UFC | OFC | DZC | IOC |

TABLE 19

FPSCR Exception Status Byte Field Definitions

| Register Bit | Name | Function |
| --- | --- | --- |
| 7:5 | Reserved | |
| 4 | IXC | Inexact exception detected |
| 3 | UFC | Underflow exception detected |
| 2 | OFC | Overflow exception detected |
| 1 | DZC | Divide by zero exception detected |
| 0 | IOC | Invalid Operation exception detected |

5.3 Register File Content Register (FPREG)

The Register File Content Register is a privileged register containing information which may be used by a debugger to properly present the contents of the register as interpreted by the currently running program. The FPREG contains 16 bits, one bit Illustration 15
FPREG Register Encoding

| 31 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| Reserved | | C15 | C14 | C13 | C12 | C11 | C10 | C9 | C8 | C7 | C6 | C5 | C4 | C3 | C2 | C1 | C0 | for each double precision register in the register file. If the bit is set, the physical register pair represented by the bit is to be displayed as a double precision register. If the bit is clear, the physical register is uninitialized or contains one or two single precision data values.

TABLE 20

FPREG Bit Field Definitions

| FPREG bit | Bit Set | Bit Clear |
|---|---|---|
| C0 | D0 valid | S1 and S0 valid or uninitialized |
| C1 | D1 valid | S3 and S2 valid or uninitialized |
| C2 | D2 valid | S5 and S4 valid or uninitialized |
| C3 | D3 valid | S7 and S6 valid or uninitialized |
| C4 | D4 valid | S9 and S8 valid or uninitialized |
| C5 | D5 valid | S11 and S10 valid or uninitialized |
| C6 | D6 valid | S13 and S12 valid or uninitialized |
| C7 | D7 valid | S15 and S14 valid or uninitialized |
| C8 | D8 valid | S17 and S16 valid or uninitialized |
| C9 | D9 valid | S19 and S18 valid or uninitialized |
| C10 | D10 valid | S21 and S20 valid or uninitialized |
| C11 | D11 valid | S23 and S22 valid or uninitialized |
| C12 | D12 valid | S25 and S24 valid or uninitialized |
| C13 | D13 valid | S27 and S26 valid or uninitialized |
| C14 | D14 valid | S29 and S28 valid or uninitialized |
| C15 | D15 valid | S31 and S30 valid or uninitialized |

6. Exception Processing

The FPS operates in one of two modes, a debug mode and a normal mode. If the DM bit is set in the FPSCR, the FPS operates in debug mode. In this mode the FPS executes one instruction at a time while ARM is made to wait until the exception status of the instruction is known. This will guarantee the register file and memory are precise with respect to instruction flow, but at the expense of much increased execution time. The FPS will accept a new instruction from the ARM when resources allow, and signal exceptions upon detection of the exceptional condition. Exception reporting to the ARM will always be precise with respect to the floating point instruction stream except in the case of a load or store operation which follows a vector operation and executes in parallel with the vector operation. In this case the contents of the register file, for load operations, or memory, for store operations, may not be precise.

6.1 Support Code

Implementations of the FPS may elect to be IEEE 754 compliant with a combination of hardware and software support. For unsupported data types and automatic exceptions, the support code will perform the function of compliant hardware and return the result, when appropriate, to the destination register and return to the user's code without calling a user's trap handler or otherwise modifying the flow of the user's code. It will appear to the user that the hardware alone was responsible for the processing of the floating point code. Bouncing to support code to handle these features significantly increases the time to perform or process the feature, but the incidence of these situations is typically minimal in user code, embedded applications, and well written numeric applications.

The support code is intended to have two components: a library of routines which perform operations beyond the scope of the hardware, such as transcendental computations, as well as supported functions, such as divide with unsupported inputs or inputs which may generate an exception; and a set of exception handlers which process exception traps in order to provide IEEE 754 compliance. The support code is required to perform implemented functions in order to emulate proper handling of any unsupported data type or data representation (e.g., denormal values). The routines may be written to utilize the FPS in their intermediate calculations if care is taken to restore the users' state at the exit of the routine.

6.2 Exception Reporting and Processing

Exceptions in normal mode will be reported to the ARM on the next floating point instruction issued after the exception condition is detected. The state of the ARM processor, the FPS register file, and memory may not be precise with respect to the offending instruction at the time the exception is taken. Sufficient information is available to the support code to correctly emulate the instruction and process any exception resulting from the instruction.

In some implementations, support code may be used to process some or all operations with special IEEE 754 data, including infinities, NaNs, denormal data, and zeros. Implementations which do so will refer to these data as unsupported, and bounce to the support code in a manner generally invisible to user code, and return with the IEEE 754 specified result in the destination register. Any exceptions resulting from the operation will abide by the IEEE 754 rules for exceptions. This may include trapping to user code if the corresponding exception enable bit is set.

The IEEE 754 standard defines the response to exceptional conditions for both cases of the exception enabled and disabled in the FPSCR. The VFPv1 Architecture does not specify the boundary between the hardware and software used to properly comply with the IEEE 754 specification.

6.2.1 Unsupported Operations and Formats

The FPS does not support any operations with decimal data or conversion to or from decimal data. These operations are required by the IEEE 754 standard and must be provided by the support code. Any attempt to utilize decimal data will require library routines for the desired functions. The FPS has no decimal data type and cannot be used to trap instructions which use decimal data.

6.2.2 Use of FMOVX When the FPS is Disabled or Exceptional

The FMOVX instruction, executed in SUPERVISOR or UNDEFINED mode may read and write the FPSCR or read the FPSID or FPREG when the FPS is in an exceptional state or is disabled (if the implementation supports a disable option) without causing an exception to be signalled to the ARM.

Although particular embodiments of the invention have been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus for at least storing data, said data comprised of first and second type data, said first type data having a format different from said second type data, said apparatus having a mode of operation wherein data of said second type, comprising an even multiple of data words, is processed, the data processing apparatus comprises:
   a register bank having a plurality of data slots for storing data words of said first type data and said second type data;
   transfer logic responsive to a store instruction, to control the storing of the data words in the register bank to a memory;
   a format register for storing format data indicating the distribution in the register bank of data words of data of said first type data and said second type data;
   in said mode of operation, the transfer logic being responsive to said store instruction specifying an even number of data words to cause those data words to be stored from said register bank to said memory, and being responsive to said store instruction specifying an odd number of data words, to cause the format data from the format register to be stored to said memory along with an even number of data words from the register bank.

2. A data processing apparatus as claimed in claim 1, wherein the store instruction is initiated by a code unaware of the register bank content, and is arranged to be issued in said second mode of operation specifying an odd number of data words, upon receipt of the store instruction, said transfer logic being arranged to cause said format data from the format register to be stored to said memory in addition to said even number of data words from the register bank.

3. A data processing apparatus as claimed in claim 2, wherein, upon receipt of a subsequent load instruction issued in said second mode of operation and specifying an odd number of data words, the transfer logic is arranged to cause the format data to be loaded into the format register in addition to an even number of data words being loaded into the register bank.

4. A data processing apparatus as claimed in claim 2, wherein said code is context switch code.

5. A data processing apparatus as claimed in claim 1, wherein the register bank has an even number 'n' of data slots, and the apparatus further comprises one or more additional registers for storing additional information associated with the data processing apparatus, wherein if the store instruction is issued in said second mode of operation specifying n+x data words, where x is an odd integer, then said transfer logic is arranged to cause all n data words in the register bank to be stored to memory, in addition to the contents of at least one of the format register and said additional resisters.

6. A data processing apparatus as claimed in claim 5, wherein if x is 1, the transfer logic is arranged to cause all n data words in the register bank to be stored to memory, in addition to the format data in the format register.

7. A data processing apparatus as claimed in claim 5, wherein one of said additional registers is a control register, and if x is a value other than 1, the transfer logic is arranged to cause all n data words in the register bank to be stored to memory, in addition to the format data in the format register and the contents of said control register.

8. A data processing apparatus as claimed in claim 5, wherein at least one of said additional registers are exception registers storing exception attributes, and if x is a value other than 1, the transfer logic is arranged to cause all n data words in the register bank to be stored to memory, in addition to the format data in the format register and the contents of the one or more exception registers.

9. A data processing apparatus as claimed in claim 5, wherein if x is a value other than 1, the transfer logic is arranged to cause all n data words in the register bank to be stored to memory, in addition to the format data in the format register and the contents of all said additional registers.

10. A data processing apparatus as claimed in claim 1, wherein said data slots are grouped into a plurality of logical regions, within each logical region, said data slots storing either data words of said first type data or said second type data, and the format data indicating for each logical region which data type is associated with the data words stored in that logical region.

11. A data processing apparatus as claimed in claim 10, wherein one bit of format data is provided for each said logical region.

12. A data processing apparatus as claimed in claim 1, wherein data of said first type is single precision data.

13. A data processing apparatus as claimed in claim 1, wherein data of said second type is double precision data.

14. A data processing apparatus as claimed in claim 1, wherein: data of said first type is single precision data comprising a single data word; data of said second type is double precision data comprising two data words; said data slots are grouped into a plurality of logical regions, each logical region comprising two data slots, and within each logical region, said data slots storing either data words of said single precision data or data words of said double precision data.

15. A data processing apparatus as claimed in claim 14, wherein said format data is arranged to indicate for each logical region whether the data words stored in that logical region represent two items of single precision data, or one item of double precision data.

16. A data processing apparatus as claimed in claim 1, further comprising a main processor and a coprocessor, the coprocessor comprising said register bank, said transfer logic and said format register, and the transfer logic being responsive to store and load instructions issued by the main processor.

17. A data processing apparatus as claimed in claim 16, wherein, upon a context switch event, the main processor is arranged to issue to the coprocessor a store instruction in said second mode of operation specifying an odd number of data words.

18. A method of operating a data processing apparatus having data of first and second types, said first type of data having a format different from the format of said second type of data, said apparatus having a mode of operation where data of said second type comprising an even multiple of data words, is processed, the method comprising the steps of:

storing in a register bank data words of said first type data and said second type data, the register bank having a plurality of data slots for storing said data words of said first and second type data;

storing in a format register format data indicating the distribution in the register bank of data words of said first type data and said second type data;

in said mode of operation, responsive to a store instruction specifying an even number of data words, causing those data words from said register bank to be stored to said memory; and in said mode of operation, responsive to said store instruction specifying an odd number of data words, causing the format data from the format register to be stored to said memory along with an even number of data words from the register bank.

* * * * *